United States Patent
Kim et al.

(10) Patent No.: US 11,382,090 B2
(45) Date of Patent: Jul. 5, 2022

(54) METHOD AND DEVICE FOR TRANSMITTING OR RECEIVING PDCCH IN WIRELESS COMMUNICATION SYSTEM

(71) Applicant: Samsung Electronics Co., Ltd., Suwon-si (KR)

(72) Inventors: Taehyoung Kim, Suwon-si (KR); Youngbum Kim, Suwon-si (KR); Jinyoung Oh, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 17/053,866

(22) PCT Filed: May 10, 2019

(86) PCT No.: PCT/KR2019/005669
§ 371 (c)(1),
(2) Date: Nov. 9, 2020

(87) PCT Pub. No.: WO2019/216715
PCT Pub. Date: Nov. 14, 2019

(65) Prior Publication Data
US 2021/0235425 A1    Jul. 29, 2021

(30) Foreign Application Priority Data

May 11, 2018 (KR) .................. 10-2018-0054322
Aug. 10, 2018 (KR) .................. 10-2018-0093947

(51) Int. Cl.
H04W 72/04     (2009.01)
H04W 24/04     (2009.01)
H04W 72/02     (2009.01)

(52) U.S. Cl.
CPC ......... *H04W 72/042* (2013.01); *H04W 24/04* (2013.01); *H04W 72/02* (2013.01)

(58) Field of Classification Search
CPC ... H04W 72/042; H04W 24/04; H04W 72/02; H04W 72/1289; H04W 28/20;
(Continued)

(56) References Cited

U.S. PATENT DOCUMENTS 10,660,044 B2 *   5/2020  MolavianJazi ..... H04W 52/242
2016/0353510 A1  12/2016  Zhang et al.
2017/0230947 A1   8/2017  Liu et al.

OTHER PUBLICATIONS

International Search Report and Written Opinion of the International Searching Authority in connection with International Application No. PCT/KR2019/005669 dated Aug. 19, 2019, 9 pages.
(Continued)

*Primary Examiner* — Kabir A Timory

(57) ABSTRACT

The present disclosure relates to a communication technique for converging a 5G communication system for supporting a higher data transfer rate beyond a 4G system with an IoT technology, and a system therefor. The present disclosure may be applied to intelligent services (for example, smart homes, smart buildings, smart cities, smart cars or connected cars, health care, digital education, retail business, security and safety-related services, etc.) on the basis of a 5G communication technology and an IoT-related technology. The present invention relates to a method for monitoring a control area by a terminal.

15 Claims, 15 Drawing Sheets

(58) Field of Classification Search
CPC ... H04L 5/0053; H04L 5/0007; H04L 5/0085; H04L 5/005; H04B 7/0695
See application file for complete search history.

(56) References Cited

OTHER PUBLICATIONS

Asustek, "Remaining details on search space," R1-1804031, 3GPP TSG-RAN WG1 Meeting #92bis, Sanya, China, Apr. 16-20, 2018, 4 pages.
LG Electronics, "Discussion on beam failure recovery," R1-1710283, 3GPP TSG RAN WG1 NR Ad-Hoc#2, Qingdao, P R. China, Jun. 27-30, 2017, 7 pages.
NTT Docomo, Inc., "Offline discussion for search space," R1-1801079, 3GPP TSG RAN WG1 NR Ad Hoc Meeting, Vancouver, Canada, Jan. 22-26, 2018, 4 pages.
ZTE, et al., "Remaining details on beam recovery," R1-1801582, 3GPP TSG RAN WG1 Meeting #92, Athens, Greece, Feb. 26-Mar. 2, 2018, 6 pages.

* cited by examiner

METHOD AND DEVICE FOR TRANSMITTING OR RECEIVING PDCCH IN WIRELESS COMMUNICATION SYSTEM

CROSS-REFERENCE TO RELATED APPLICATIONS

This application is a 371 National Stage of International Application No. PCT/KR2019/005669, filed May 10, 2019, which claims priority to Korean Patent Application No. 10-2018-0054322, filed May 11, 2018, and Korean Patent Application No. 10-2018-0093947, filed Aug. 10, 2018, the disclosures of which are herein incorporated by reference in their entirety.

BACKGROUND

1. Field

The disclosure relates to a method and apparatus for transmitting or receiving a downlink control channel in a wireless communication system. In addition, the disclosure relates to a method and apparatus for configuring a bandwidth part.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

There is a desire for a method of monitoring a control region by a user equipment (UE).

SUMMARY

Therefore, the disclosure has been made in view of the above-mentioned problem, and an aspect of the disclosure is to provide a method of monitoring a control region by a user equipment (UE). In addition, the disclosure aims to provide a method and apparatus for configuring a bandwidth part.

In accordance with an aspect of the disclosure, a method of operating a user equipment (UE) may include: receiving, from a base station (BS), first information associated with the number of physical downlink control channel (PDCCH) candidates and second information associated with the number of control channel elements (CCE); transmitting a beam failure recovery (BFR) request message to the BS in a first slot, in case that a link failure occurs; selecting a search space set of a first control region and a search space set of a second control region associated with BFR, in a second slot; and monitoring control information for receiving a BFR response message in the selected search space set of the second control region, wherein the search space set of the second control region is selected preferentially in the second slot in case that information associated with a PDCCH of the first control region and the second control region does not satisfy at least one of a first condition determined based on the first information, or a second condition determined based on the second information.

In accordance with another aspect of the disclosure, a user equipment (UE) may include: a transceiver; and a controller, connected to the transceiver and configured to perform control so as to: receive first information associated with the number of physical downlink control channel (PDCCH) candidates and second information associated with the number of control channel elements (CCEs) from a base station (BS); in case that a link failure occurs, transmit a beam failure recovery (BFR) request message to the BS in a first slot; select a search space set of a first control region and a search space set of a second slot associated with BFR, in a second slot; and monitor control information for receiving a BFR response message in the selected search space set of the second control region, wherein the search space set of the second control region is preferentially selected in case that information associated with a PDCCH of the first control region and the second control region does not satisfy at least one of a first condition determined based on the first information or a second condition determined based on the second information.

In accordance with another aspect of the disclosure, a method of operating a base station (BS) may include: transmitting first information associated with the number of physical downlink control channels (PDCCHs) and second information associated with the number of control channel elements (CCEs) to a user equipment (UE); receiving a beam failure recovery (BFR) request message from a user equipment (UE) in a first slot; selecting a search space set of a first control region and a search space set of a second control region associated with BFR in a second slot; and transmitting control information for reception of a BFR response message in a resource of the selected search space set of the second control region, wherein the search space set of the second control region is preferentially selected in case that information associated with a PDCCH of the first control region and the second control region does not satisfy at least one of a first condition determined based on the first information or a second condition determined based on the second information, in the second slot.

In accordance with another aspect of the disclosure, a base station (BS) may include: a transceiver; and a controller, connected to the transceiver and configured to perform control so as to: transmit, to a user equipment (UE), first information associated with the number of physical downlink control channel (PDCCH) candidates and second information associated with the number of control channel elements (CCEs); receive a beam failure recovery (BFR) request message from the UE in a first slot; select a search space set of a first control region and a search space set of a second control region associated with BFR in a second slot; and transmit control information for reception of a BFR response message in a resource of the selected search space set of the second control region, and wherein the search space set of the second control region is preferentially selected in the second slot in case that information associated with a PDCCH of the first control region and the second control region does not satisfy at least one of a first condition determined based on the first information or a second condition determined based on the second information.

According to an embodiment of the disclosure, there is provided a method of efficiently monitoring a control region by a user equipment (UE), and an apparatus therefor. In addition, according to an embodiment of the disclosure, there is provided a method and apparatus for configuring a bandwidth part.

DETAILED DESCRIPTION

Figure 1:
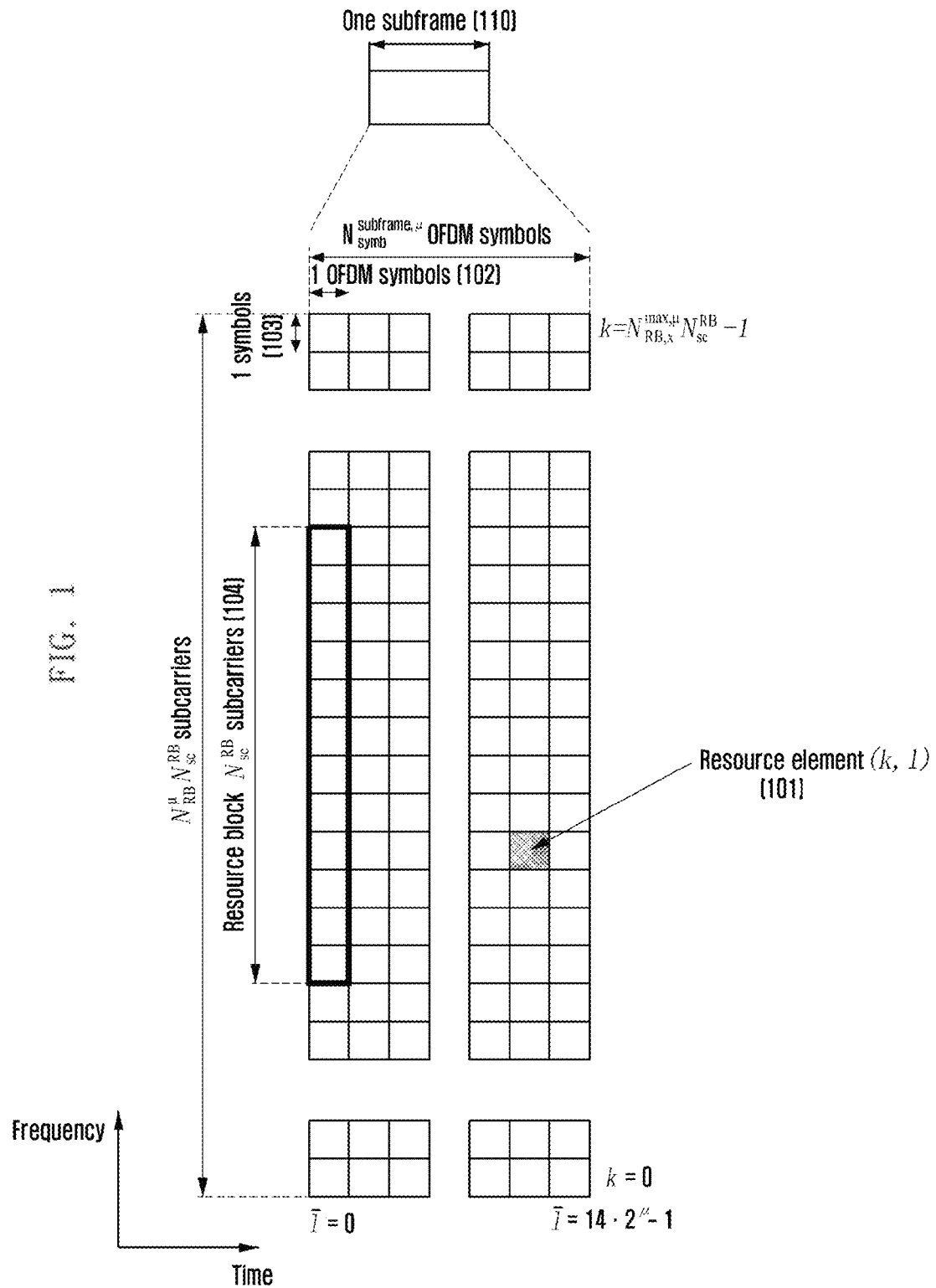
FIG. 1 is a diagram illustrating the basic structure of a time-frequency domain in 5G.

Hereinafter, embodiments of the disclosure will be described in detail with reference to the accompanying drawings. It should be noted that, in the drawings, the same or like elements are designated by the same or like reference signs as much as possible. Further, a detailed description of known functions or configurations that may make the subject matter of the disclosure unclear will be omitted.

In describing embodiments of the disclosure, descriptions associated with technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

In case that the quality of a link between a base station (BS) and a user equipment (UE) is poor, a link recovery procedure may be performed. In case that it is determined that the link quality is lower than a predetermined threshold, the UE may transmit a beam failure recovery (BFR) request message to the BS. Monitoring is performed on a predetermined control region (e.g., a control resource set (CORESET)) configured for receiving a downlink control channel (e.g., a physical downlink control channel (PDCCH)) in order to receive a response message in response to the BFR request message, a predetermined period of time after transmitting the BFR request message, for a predetermined period of time. In this instance, due to the operation of monitoring the predetermined control region (referred to as a "control region-BFR") for receiving a response message in response to the BFR, an operation of monitoring a control region, which has been monitored, may be changed. For example, in case that both the control region-BFR and the existing control region are monitored at a predetermined point in time, the maximum number of blind decoding operations or the maximum number of control channel elements (CCE) that the UE is capable of monitoring may be exceeded. Therefore, the UE may selectively monitor a predetermined search space. In order to overcome this drawback, the disclosure provides a method of monitoring a control region by a UE after transmitting a BFR request message. In the disclosure, the UE may differently control monitoring of a control region depending on whether a reference signal (RS) set for detecting BFR is configured by the BS. In addition, in case that the both the control region—BFR and the existing control region are monitored at the same time, a search space configured in the control region_BFR may be preferentially monitored.

In a 5G communication system, a control region in which a downlink control channel is transmitted may be configured for the UE by the BS using a master information block (MIB) or radio resource control (RRC) signaling transmitted via a physical broadcast channel (PBCH). As an identifier (ID), "0" may be assigned to a control region that is configured using an MIB. The control region configured using an MIB may be configured using a parameter different from a parameter used for a control region that may be configured using RRC. In the 5G communication system, an initial bandwidth part (BWP) for performing an initial access procedure may be configured for the UE. In this instance, the initial bandwidth part may be defined to be in the same frequency region as that of control region #0. After an RRC connection is established, the UE may receive bandwidth configuration information from the BS via RRC signaling. The disclosure provides a method of configuring control region #0 using UE-specific RRC and a method of performing configuration so as to monitor a control region that is the same as control region #0 in another bandwidth part. In the method of configuring the control region, which is the same as control region #0, using UE-specific RRC, in case that predetermined fields are disabled for a control region configured using RRC, the corresponding control region is regarded as the configuration of a control region that is the same as control region #0. Alternatively, in case that the time/frequency region of the control region configured using RRC is included in the time/frequency region of control region #0, the control region configured using RRC is identified as being the control region that is the same as control region #0. Subsequently, in the method of configuring a control region of which the identifier is "0", in another bandwidth path, in case that the number of configured bandwidth parts is less than 4, control region #0 may not be reconfigured using RRC. In case that control region #0 is reconfigured, the UE may regard the same as an error. In case that the number of configured bandwidth parts is 4, control region #0 may be reconfigured in another bandwidth part using UE-specific RRC. In this instance, the UE may replace the configuration of control region #0 configured using an MIB with control region #0 configured using RRC.

A wireless communication system has developed into a broadband wireless communication system that provides high-speed and high-quality packet data service, like communication standards, such as, high-speed packet access (HSPA) of 3GPP, long-term evolution (LTE) (or evolved universal terrestrial radio access (E-UTRA)), LTE-advanced (LTE-A), LTE-pro, high-rate packet data (HRPD) of 3GPP2, ultra-mobile broadband (UMB), and 802.16e of IEEE, or the like, beyond the voice-based service provided at the initial stage.

An LTE system, which is a representative example of a broadband wireless communication system, employs an orthogonal frequency-division multiplexing (OFDM) scheme for a downlink (DL), and employs a single-carrier frequency-division multiple access (SC-FDMA) scheme for an uplink (UL). "Uplink" refers to a radio link via which a UE (user equipment (UE) or a mobile station (MS)) transmits data or a control signal to an eNB (an eNode B or a base station(BS)). "Downlink" refers to a radio link via which a BS transmits data or a control signal to a UE. The multiple-access scheme described above may allocate or manage time-frequency resources in which data or control information is carried for each user, so as to not overlap one another, that is, to have orthogonality, thereby distinguishing data or control information of each user.

A future communication system after LTE, that is, a 5G communication system, needs to freely apply various requirements from users, service providers, and the like, and thus service that satisfies various requirements in parallel needs to be supported. Services considered for the 5G communication system may include enhanced mobile broadband (eMBB), massive machine type communication (mMTC), ultra reliability low latency communication (URLLC), and the like.

eMBB aims at providing a data transmission rate superior to a data transmission rate supported by legacy LTE, LTE-A, or LTE-pro. For example, in the 5G communication system, eMBB needs to provide a peak data rate of 20 Gbps in a downlink and a peak data rate of 10 Gbps in an uplink from the perspective of a single BS. In addition, the 5G communication system needs to provide an enhanced user-perceived data rate of a UE, in addition to a peak data rate. In order to satisfy these requirements, there is a desire to improve various transmission or reception technologies including advanced multi-input multi-output (MIMO) transmission technology. In addition, LTE transmits a signal using a maximum transmission bandwidth of 20 MHz in the 2 GHz band that LTE currently uses. However, the 5G communication system uses a frequency bandwidth wider than 20 MHz in a frequency band ranging 3 to 6 GHz or in a frequency band greater than or equal to 6 GHz, and thus, the data transmission rate required by the 5G communication system may be satisfied.

Further, in the 5G communication system, the use of mMTC is under consideration in order to support application services such as those associated with the Internet of Things (IoT). mMTC requires support for massive UE access within a cell, improvement of coverage of a UE, enhanced battery life expectancy, reduction of cost of a UE, and the like, in order to effectively provide IoT. IoT provides communication functions via attachment to various sensors and various devices, and thus a large number of UEs needs to be supported within a cell (e.g., 1,000,000 UEs/km2). In addition, a UE that supports mMTC has a high probability of being located in a shadow area that a cell cannot cover, such as the basement of a building, due to the characteristics of the service, and may require a coverage area wider than those of other services provided by the 5G communication system. The UE that supports mMTC needs to be manufactured as an inexpensive UE. In addition, since it is difficult to frequently change the battery of the UE, a long battery life, such as 10 to 15 years, may be required.

URLLC is a mission-critical cellular-based wireless communication service. For example, a remote control service for a robot or machinery, an industrial automation service, an unmanned aerial vehicle service, a remote heath care service, an emergency alert service, and the like may be considered. Therefore, communication provided by URLLC may need to provide significantly low latency and significantly high reliability. For example, service that supports URLLC needs to satisfy an air interface latency less than 0.5 milliseconds, and at the same time, needs to satisfy a packet error rate less than or equal to $10^{-5}$. Therefore, for a service that supports URLLC, the 5G system needs to provide a transmit time interval (TTI) smaller than those of other services, and is simultaneously required to allocate a wide resource in a frequency band in order to secure reliability of a communication link.

The three services in 5G, namely eMBB, URLLC, and mMTC, may be multiplexed and transmitted in a single system. In this instance, in order to satisfy the different requirements of the services, transmission or reception schemes and transmission or reception parameters that differ among the services may be used.

Hereinafter, the frame structure of the 5G system will be described in detail with reference to drawings.

FIG. 1 is a diagram illustrating the basic structure of a time-frequency domain, which is a radio resource region in which data or a control channel is transmitted in a 5G system.

In FIG. 1, the horizontal axis refers to the time domain and the vertical axis refers to the frequency domain. In the time-frequency domain, the basic unit of a resource is a resource element (RE) 101, which is defined by one orthogonal frequency-division multiplexing (OFDM) symbol 102 on the time axis and one subcarrier 103 on the frequency axis. In the frequency domain, a single resource block (RB) 104 may include $N_{sc}^{RB}$ (e.g., 12) consecutive REs. A single subframe 110 may include, for example, 14 OFDM symbols (e.g., in case that a subcarrier spacing is 15 kHz) on the time axis, and may correspond to 1 ms.

Figure 2:
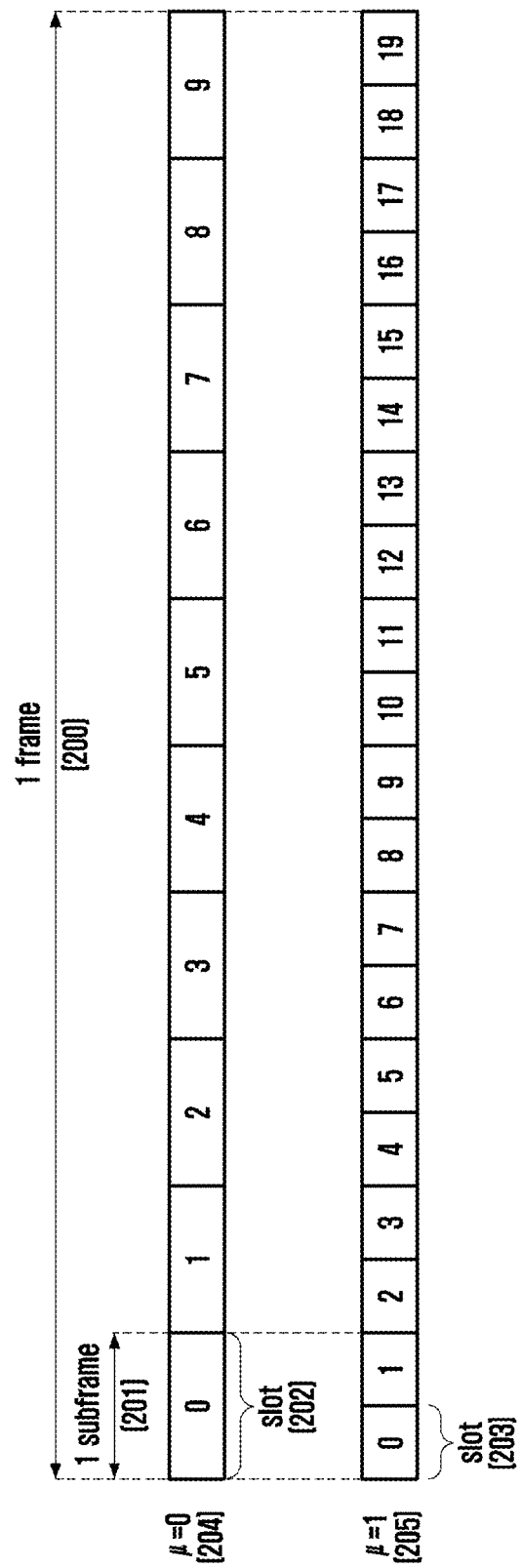
FIG. 2 is a diagram illustrating the structures of a frame, a subframe, and a slot in 5G.

FIG. 2 is a diagram illustrating the structure of a slot considered in a 5G system.

FIG. 2 illustrates an example of the structures of a frame 200, a subframe 201, and a slot 202. One frame 200 may be defined to be 10 ms long. One subframe 201 may be defined to be 1 ms long. Therefore, one frame 200 may include a total of 10 subframes 201. Each of slots 202 and 203 may be defined by 14 OFDM symbols (i.e., symbols per slot ($N_{symb}^{slot}$)=14). One subframe 201 may include one or multiple slots 202 and 203, and the number of slots 202 and 203 per subframe 201 may differ depending on a set value μ 204 and 205 for a subcarrier spacing. The example of FIG. 2 illustrates the case in which a subcarrier spacing set value is μ=0 204 and the case in which a subcarrier spacing set value is μ=1 205. In the case of μ=0 204, one subframe 201 may include one slot 202. In the case of μ=1 205, one subframe 201 may include two slots 203. That is, depending on a set value μ for a subcarrier spacing, the number of slots per subframe ($N_{slot}^{subframe,\mu}$) may be changed. Accordingly, the number of slots per frame ($N_{slot}^{frame,\mu}$) may be changed. $N_{slot}^{subframe,\mu}$ and $N_{slot}^{frame,\mu}$, which vary depending on a subcarrier spacing set value μ, may be defined as shown in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Subsequently, the configuration of a bandwidth part (BWP) in the 5G communication system will be described in detail with reference to drawings.

Figure 3:
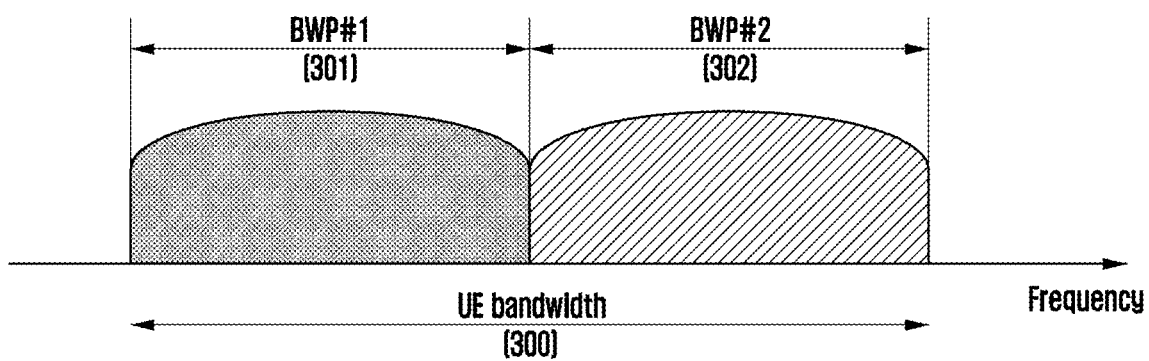
FIG. 3 is a diagram illustrating an example of the configuration of a bandwidth part in 5G.

FIG. 3 is a diagram illustrating an example of the configuration of a bandwidth part in a 5G communication system.

FIG. 3 illustrates an example in which a UE bandwidth 300 is configured to include two bandwidth parts, that is, bandwidth part #1 301 and bandwidth part #2 302. A base station (BS) may configure one or multiple bandwidth parts for a user equipment (UE). The BS may configure, for the UE, pieces of information in association with respective bandwidth parts, as shown in Table 2 below.

TABLE 2

| | |
|---|---|
| BWP ::= | SEQUENCE { |
| bwp-Id | BWP-Id, |
| locationAndBandwidth | INTEGER (1..65536), |
| subcarrierSpacing | ENUMERATED {n0, n1, n2, n3, n4, n5}, |
| cyclicPrefix | ENUMERATED { extended } |
| } | |

In addition to the above-described configuration information, various parameters associated with a bandwidth part may be configured for the UE. The information may be transferred from the BS to the UE via higher-layer signaling, for example, RRC signaling. At least one bandwidth part among the one or multiple configured bandwidth parts may be activated (activation). Information associated with whether to activate a configured bandwidth part may be transferred from the BS to the UE semi-statically via RRC signaling, or dynamically via downlink control information (DCI).

Before RRC connection is established, the initial bandwidth part (initial BWP) for initial access may be configured for the UE by the BS via a master information block (MIB). Particularly, the UE may receive, via the MIB at the initial access stage, configuration information associated with a control resource set (CORESET) and a search space in which a PDCCH may be transmitted, wherein the PDCCH is used for receiving system information (corresponding to remaining system information (RMSI) or system information block 1 (SIB1)) needed for initial access. Each of the control region and the search space configured using the MIB may be regarded to have an identifier (ID) of "0". The BS may inform the UE of configuration information associated with control region #0, such as frequency allocation information, time allocation information, numerology, and the like, via the MIB. In addition, the BS may inform the UE of a periodicity for monitoring control region #0 and configuration information associated with an occasion, that is, configuration information associated with search space #0, via the MIB. The UE may regard a frequency region that is configured to be control region #0, obtained from the MIB, as the initial bandwidth part for initial access. In this instance, the identifier (ID) for the initial bandwidth part is regarded as "0".

Bandwidth part configuration supported in 5G may be used for various purposes.

For example, in case that the bandwidth supported by a UE is smaller than the system bandwidth, bandwidth part configuration may be used to support the bandwidth supported by the UE. For example, in case that the frequency location of a bandwidth part (configuration information 2 or locationAndBandwidth) in Table 2 is configured for a UE, the UE is capable of transmitting or receiving data at a predetermined frequency location in the system bandwidth.

As another example, to support different numerologies, a BS may configure multiple bandwidth parts for a UE. For example, in order to support data transmission or reception based on both a subcarrier spacing of 15 kHz and a subcarrier spacing of 30 kHz for a UE, a BS may configure two bandwidth parts based on the subcarrier spacing of 15 kHz and the subcarrier spacing of 30 kHz, respectively. The different bandwidth parts may be frequency-division multiplexed (frequency-division multiplexing), and in case that data transmission or reception based on a predetermined subcarrier spacing is needed, a bandwidth part configured based on the corresponding subcarrier spacing may be activated.

As another example, a BS may configure bandwidth parts having different bandwidths for a UE for the purpose of reducing power consumption by the UE. For example, in case that a UE supports a significantly wide bandwidth, that is, a bandwidth of 100 MHz, and always transmits or receives data using the corresponding bandwidth, the UE may consume a significantly large amount of power. Particularly, in the state in which traffic does not exist, unnecessarily monitoring a downlink control channel in a large bandwidth of 100 MHz may be very inefficient from the perspective of power consumption. Accordingly, in order to reduce the power consumption of the UE, the BS may configure a bandwidth part of a relatively smaller bandwidth, for example, a bandwidth part of 20 MHz, for the UE. In the state in which traffic does not exist, the UE may perform monitoring in the bandwidth part of 20 MHz, and in case that data is present, the UE may transmit or receive the data via the bandwidth part of 100 MHz according to an instruction from the BS.

In the method of configuring a bandwidth part, before RRC connection is established, UEs may receive configuration information associated with an initial bandwidth part via a master information block (MIB) at the initial access stage. Particularly, a control region (control resource set (CORESET)) for a downlink control channel, in which downlink control information (DCI) that schedules a system information block (SIB) may be transmitted, may be configured for a UE via an MIB of a physical broadcast channel (PBCH). The bandwidth of the control region configured using the MIB may be regarded as an initial bandwidth part, and the UE may receive a PDSCH, in which an SIB is transmitted, via the configured initial bandwidth part. The initial bandwidth part may be used for other system information (OSI), paging, and random access, in addition to reception of an SIB.

Subsequently, a synchronization signal (SS)/PBCH block in 5G will be described.

An SS/PBCH block refers to a physical channel block including a primary SS (PSS), a secondary SS (SSS), and a PBCH, and the detailed description thereof is as follows.

PSS: a signal that is a reference for downlink time/frequency synchronization, and provides some information of a cell ID SSS: a signal that is a reference for downlink time/frequency synchronization, and provides the remaining cell ID information that the PSS does not provide. In addition, the SSS may act as a reference signal for demodulation of a PBCH.

PBCH: provides essential system information needed for transmission or reception of a data channel and a control channel of a UE. The essential system information may include search-space-related control information indicating radio resource mapping information of a control channel, scheduling control information associated with a separate data channel that transmits system information, and the like.

SS/PBCH block: An SS/PBCH block is a combination of a PSS, an SSS, and a PBCH. One or multiple SS/PBCH blocks may be transmitted within 5 ms, and each transmitted SS/PBCH block may be identified by an index.

A UE may detect a PSS and an SSS at the initial access stage, and may decode a PBCH. The UE may obtain an MIB from the PBCH, whereby the UE may be configured with control region #0. The UE may perform monitoring on control region #0 by assuming that a selected SS/PBCH block and a DMRS transmitted in control region #0 are in a quasi-co-located (QCL) relationship. The UE may receive system information via downlink control information transmitted in control region #0. The UE may obtain, from the received system information, random access channel (RACH)-related configuration information which is needed for initial access. The UE may transmit a physical RACH (PRACH) to a BS in consideration of the index of the SS/PBCH block selected by the UE, and the BS that receives the PRACH may obtain information associated with the index of the SS/PBCH block index selected by the UE. Therefore, the BS may be aware which block is selected by the UE among SS/PBCH blocks, and may be aware that the UE is monitoring control region #0, which is associated with the selected block.

Subsequently, downlink control information (DCI) in the 5G system will be described in detail.

In the 5G system, scheduling information associated with uplink data (or a physical uplink data channel (physical uplink shared channel (PUSCH))) or downlink data (or a physical downlink data channel (physical downlink shared channel (PDSCH))) may be transferred from a BS to a UE via DCI. The UE may monitor a fallback DCI format and a non-fallback DCI format in association with a PUSCH or PDSCH. The fallback DCI format may be implemented as a fixed field predetermined between the BS and the UE, and the non-fall back DCI format may include a settable field.

The DCI may pass through a channel-coding and modulation process, and may be transmitted via a physical downlink control channel (PDCCH). A cyclic redundancy check (CRC) is added to the payload of a DCI message, and the CRC may be scrambled with a radio network temporary identifier (RNTI) corresponding to a UE identity. Different RNTIs may be used depending on the purpose of the DCI message, for example, UE-specific data transmission, power control command, random access response, or the like. That is, an RNTI is not explicitly transmitted, but is transmitted by being included in a CRC calculation process. In case that a UE receives a DCI message transmitted on a PDCCH, the UE may identify a CRC using an allocated RNTI. In case that the CRC identification result is correct, the UE may identify that the corresponding message is transmitted for the UE.

For example, a DCI that schedules a PDSCH associated with system information (SI) may be scrambled with an SI-RNTI. A DCI that schedules a PDSCH associated with a random access response (RAR) message may be scrambled with an RA-RNTI. A DCI that schedules a PDSCH associated with a paging message may be scrambled with a P-RNTI. A DCI that reports a slot format indicator (SFI) may be scrambled with an SFI-RNTI. A DCI that reports a transmit power control (TPC) may be scrambled with a TPC-RNTI. A DCI that schedules a UE-specific PDSCH or PUSCH may be scrambled with a cell RNTI (C-RNTI).

DCI format 0_0 may be used as a fallback DCI for scheduling a PUSCH. In this instance, a CRC may be scrambled with a C-RNTI. DCI format 0_0, the CRC of which is scrambled with a C-RNTI, may include, for example, the information listed in Table 3 below.

TABLE 3

Identifier for DCI formats - [1] bit
Frequency domain resource assignment -
$[\lceil \log_2(N_{RB}^{UL,BWP}(N_{RB}^{UL,BWP} + 1)/2) \rceil]$ bits
Time domain resource assignment - X bits
Frequency hopping flag - 1 bit.
Modulation and coding scheme - 5 bits
New data indicator - 1 bit
Redundancy version - 2 bits
HARQ process number - 4 bits
TPC command for scheduled PUSCH - [2] bits
UL/SUL indicator - 0 or 1 bit DCI format 0_1 may be used as a non-fallback DCI for scheduling a PUSCH. In this instance, a CRC may be scrambled with a C-RNTI. DCI format 0_1, the CRC of which is scrambled with a C-RNTI, may include, for example, the information listed in Table 4 below.

TABLE 4

Carrier indicator-0 or 3 bits
UL/SUL indicator-0 or 1 bit
Identifier for DCI formats-[1] bits
Bandwidth part indicator-0, 1 or 2 bits
Frequency domain resource assignment
For resource allocation type 0, $\lceil N_{RB}^{UL,BWP}/P \rceil$ bits
For resource allocation type 1, $\lceil \log_2 (N_{RB}^{UL,BWP}(N_{RB}^{UL,BWP} + 1)/2) \rceil$ bits
Time domain resource assignment-1, 2, 3, or 4 bits
VRB-to-PRB mapping-0 or 1 bit, only for resource allocation type 1.
0 bit if only resource allocation type 0 is configured;
1 bit otherwise.
Frequency hopping flag-0 or 1 bit, only for resource allocation type 1.
0 bit if only resource allocation type 0 is configured;
1 bit otherwise.
Modulation and coding scheme-5 bits
New data indicator-1 bit
Redundancy version-2 bits
HARQ process number-4 bits
1st downlink assignment index-1 or 2 bits
1 bit for semi-static HARQ-ACK codebook;
2 bits for dynamic HARQ-ACK codebook with single HARQ-ACK codebook.
2nd downlink assignment index-0 or 2 bits
2 bits for dynamic HARQ-ACK codebook with two HARQ-ACK sub-codebooks;
0 bit otherwise.
TPC command for scheduled PUSCH-2 bits $SRS$ resource indicator- $\left\lceil \log_2 \left( \sum_{k=1}^{L_{max}} \binom{N_{SRS}}{k} \right) \right\rceil$ or $\lceil \log_2(N_{SRS}) \rceil$ bits $\left\lceil \log_2 \left( \sum_{k=1}^{L_{max}} \binom{N_{SRS}}{k} \right) \right\rceil$ bits for non-codebook based $PUSCH$ transmission;

$\lceil \log_2 (N_{SRS}) \rceil$ bits for codebook based PUSCH transmission;
Precoding information and number of layers-up to 6 bits
Antenna ports-up to 5 bits
SRS request-2 bits
CSI request-0, 1, 2, 3, 4, 5, or 6 bits
CBG transmission information-0, 2, 4, 6, or 8 bits
PTRS-DMRS association-0 or 2 bits.
beta_offset indicator-0 or 2 bits
DMRS sequence initialization-0 or 1 bit DCI format 1_0 may be used as a fallback DCI for scheduling a PDSCH. In this instance, a CRC may be scrambled with a C-RNTI. DCI format 1_0, the CRC of which is scrambled with a C-RNTI, may include, for example, the information listed in Table 5 below.

TABLE 5

Identifier for DCI formats - [1] bit
Frequency domain resource assignment -
[⌈log$_2$(N$_{RB}^{DL, BWP}$(N$_{RB}^{DL, BWP}$ + 1)/2)⌉] bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator - 3 bits
PDSCH-to-HARQ feedback timing indicator - [3] bits DCI format 1_1 may be used as a non-fallback DCI for scheduling a PDSCH. In this instance, a CRC may be scrambled with a C-RNTI. DCI format 1_1, the CRC of which is scrambled with a C-RNTI, may include, for example, the information listed in Table 6 below.

TABLE 6

Carrier indicator - 0 or 3 bits
Identifier for DCI formats - [1] bits
Bandwidth part indicator - 0, 1 or 2 bits
Frequency domain resource assignment
For resource allocation type 0, ⌈N$_{RB}^{DL, BWP}$/P⌉ bits
For resource allocation type 1, ⌈log$_2$(N$_{RB}^{DL, BWP}$(N$_{RB}^{DL, BWP}$ + 1)/2)⌉ bits
Time domain resource assignment -1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator - 0 or 1 bit
Rate matching indicator - 0, 1, or 2 bits
ZP CSI-RS trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits

TABLE 6-continued

Downlink assignment index - 0, 2 or 4 bits
TPC command for scheduled PUCCH - 2 bits
PUCCH resource indicator - 3 bits
PDSCH-to-HARQ_feedback timing indicator - 3 bits

TABLE 6-continued

Antenna ports - 4, 5 or 6 bits
Transmission configuration indication - 0 or 3 bits
SRS request - 2 bits
CBG transmission information - 0, 2, 4, 6, or 8 bits
CBG flushing out information - 0 or 1 bit
DMRS sequence initialization - 1 bit Hereinafter, a downlink control channel in the 5G communication system will be described in detail with reference to the drawings.

Figure 4:
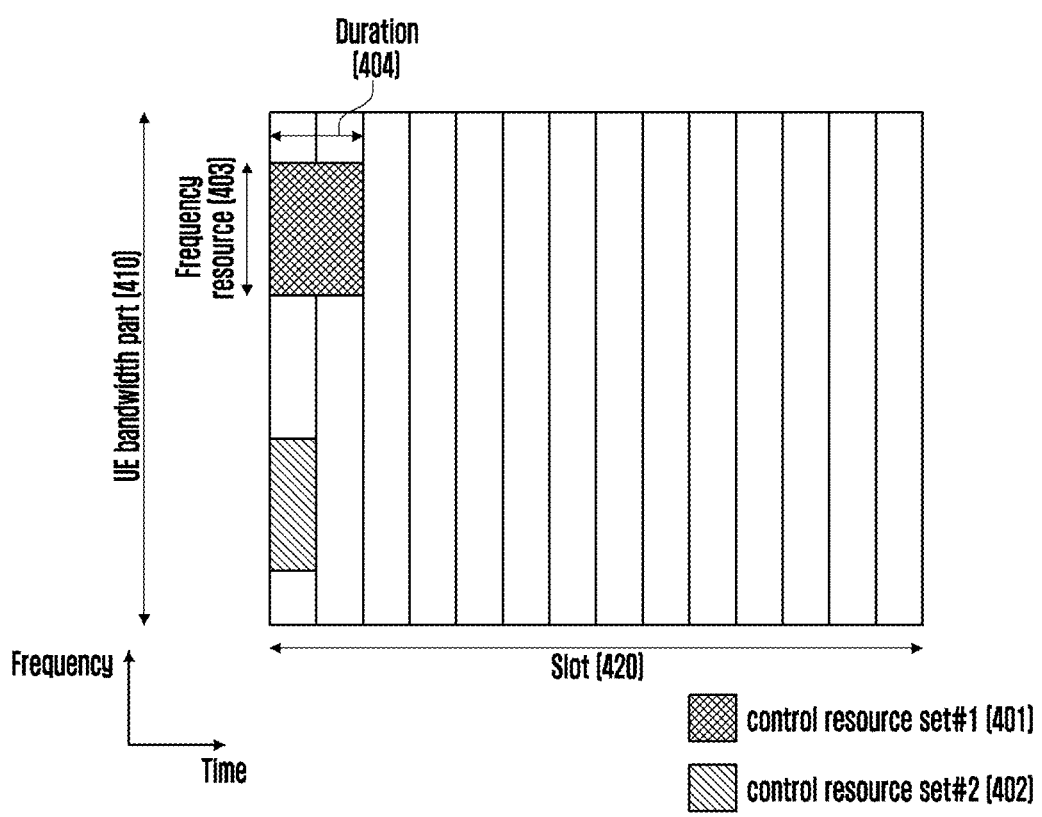
FIG. 4 is a diagram illustrating an example of the configuration of a control region of a downlink control channel in 5G.

FIG. 4 is a diagram illustrating an example of a control region (a control resource set (CORESET)) in which a downlink control channel is transmitted in a 5G wireless communication system. FIG. 4 illustrates an example in which two control regions (control region #1 401 and control region #2 402) are configured within a UE bandwidth part 410 on the frequency axis and one slot 420 on the time axis. The control region 401 or 402 may be configured in a predetermined frequency resource 403 in the entire UE bandwidth part 410 on the frequency axis. The control region may be configured based on one or multiple OFDM symbols on the time axis, which may be defined as a control region length (a control resource set duration 404). In the example of FIG. 4, control region #1 401 is configured based on a control region length of 2 symbols, and control region #2 is configured based on a control region length of 1 symbol.

The control region in 5G, as described above, may be configured via higher-layer signaling (e.g., system information, a master information block (MIB), radio resource control (RRC) signaling) from a BS to a UE. Configuring a control region for a UE may be providing information such as an identifier (identity) of the control region, the frequency location of the control region, the symbol length of the control region, and the like. For example, the information listed in Table 7 below may be included.

TABLE 7

```
ControlResourceSet ::=                    SEQUENCE {
  -- Corresponds to L1 parameter 'CORESET-ID'
  controlResourceSetId                    ControlResourceSetId,
  frequencyDomainResources                BIT STRING (SIZE (45)),
  duration                                INTEGER (1..maxCoReSetDuration),
  cce-REG-MappingType                     CHOICE {
    interleaved                           SEQUENCE {
      reg-BundleSize                      ENUMERATED {n2, n3, n6},
      precoderGranularity                       ENUMERATED {sameAsREG-
    bundle, allContiguousRBs},
      interleaverSize                     ENUMERATED {n2, n3, n6}
      shiftIndex
      INTEGER(0..maxNrofPhysicalResourceBlocks-1)
    },
    nonInterleaved                        NULL
  },
  tci-StatesPDCCH                         SEQUENCE(SIZE (1..maxNrofTCI-
    StatesPDCCH)) OF TCI-StateId                    OPTIONAL,
  tci-PresentInDCI                        ENUMERATED {enabled}
}
```

In Table 7, tci-StatesPDCCH (referred to as "TCI state") configuration information may include information associated with one or more synchronization signal (SS)/physical broadcast channel (PBCH) block indices of SS/PBCH blocks or the channel state information reference signal (CSI-RS) index of a CSI-RS, which is in a quasi-co-located (QCL) relationship with a DMRS transmitted in a corresponding control region.

Figure 5:
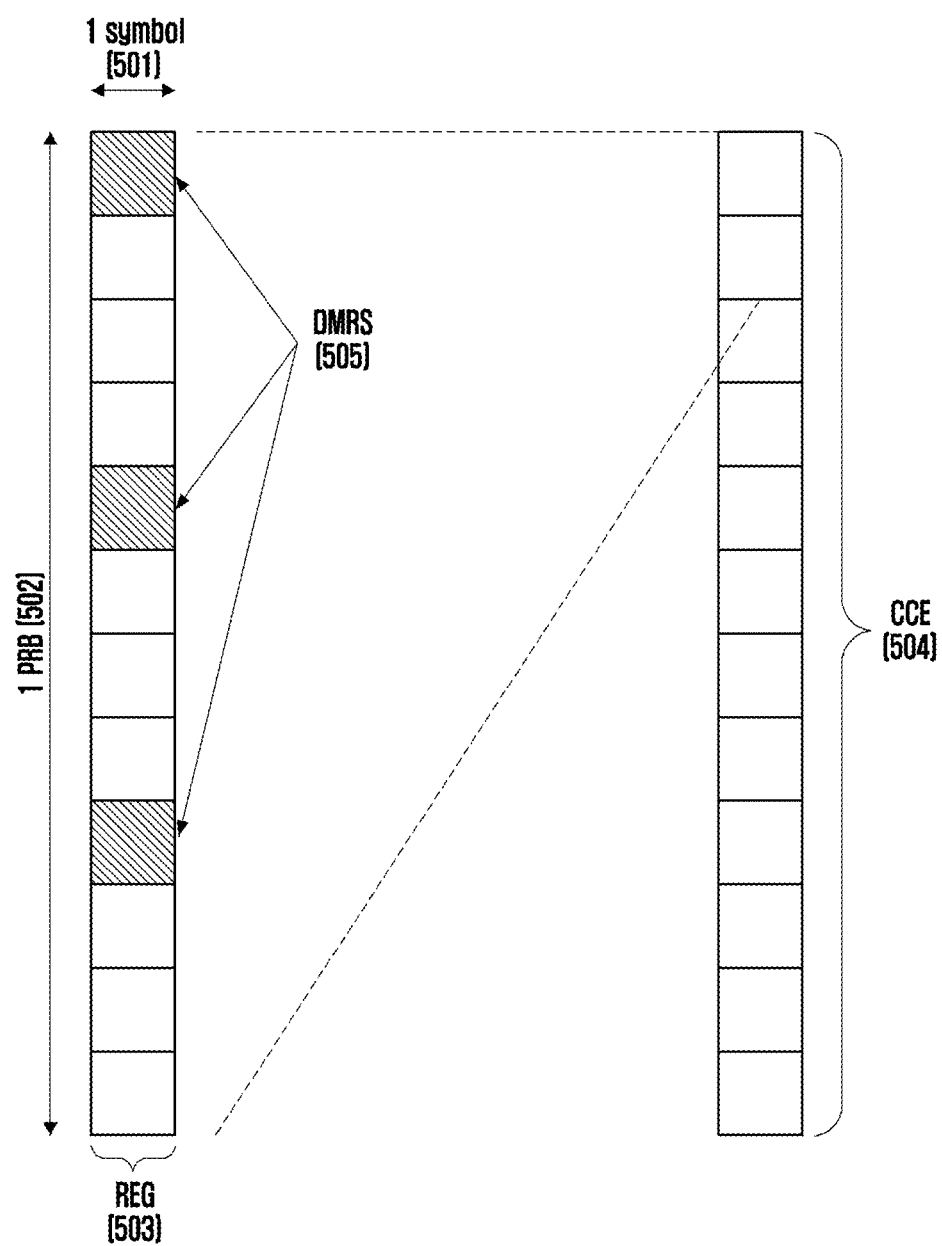
FIG. 5 is a diagram illustrating the structure of a downlink control channel in 5G.

FIG. 5 is a diagram illustrating an example of the basic unit of time and frequency resources configured for a downlink control channel usable in 5G. According to FIG. 5, the basic unit of the time and frequency resources configured for a control channel is referred to as a resource element group (REG) 503, and the REG 503 is defined by one OFDM symbol 501 on the time axis and one physical resource block (PRB) 502 on the frequency axis, that is, 12 subcarriers. A downlink control channel allocation unit may be configured by connecting the REGs 503.

As illustrated in FIG. 5, in case that a control channel element (CCE) 504 is a basic unit for allocation of a downlink control channel in 5G, one CCE 504 may include a plurality of REGs 503. A description will be provided with reference to the REG 503 of FIG. 5. In case that the REG 503 includes 12 REs and one CCE 504 includes 6 REGs 503, this means that one CCE 504 includes 72 REs. In case that a downlink control region is configured, the corresponding region includes a plurality of CCEs 504, and a predetermined downlink control channel may be transmitted by being mapped to one or multiple CCEs 504 in the control region, depending on an aggregation level (AL). The CCEs 504 in the control region may be distinguished by numbers, and the numbers may be assigned according to a logical mapping scheme.

The basic unit of the downlink control channel of FIG. 5, that is, the REG 503, may include REs to which DCI is mapped and a region to which a DMRS 505, which is a reference signal for decoding the DCI, is mapped. As illustrated in FIG. 5, three DMRSs 505 may be transmitted within one REG 503.

The number of CCEs required for transmitting a PDCCH may be 1, 2, 4, 8, or 16 depending on the aggregation level (AL), and a different number of CCEs may be used to implement link adaptation of a downlink control channel. For example, in case that AL=L, one downlink control channel may be transmitted via L CCEs. A UE needs to detect a signal without knowing information associated with a downlink control channel, and thus a search space indicating a set of CCEs is defined for blind decoding. A search space is a set of candidate downlink control channels including CCEs that a UE is supposed to attempt to decode at a given aggregation level. There are various aggregation levels for binding 1, 2, 4, 8, or 16 CCEs into a single bundle, and thus, a UE may have multiple search spaces. A search space set may be defined by a set of search spaces at all aggregation levels.

A search space may be classified as a common search space and a UE-specific search space. A group of UEs or all UEs may search a common search space associated with a PDCCH in order to receive cell-common control information, such as a paging message or dynamic scheduling associated with system information. For example, PDSCH scheduling allocation information for transmitting an SIB including cell operator information or the like may be received by searching the common search space associated with a PDCCH. Since a group of UEs or all UEs need to receive a PDCCH, a common search space may be defined as a set of CCEs agreed upon in advance. Scheduling allocation information associated with a UE-specific PDSCH or PUSCH may be received by searching a UE-specific search space associated with a PDCCH. A UE-specific search space may be defined for a specific UE based on a function of various system parameters and the identity of a UE.

In 5G, parameters for a search space for a PDCCH may be configured via higher-layer signaling (e.g., an SIB, an MIB, or RRC signaling) from a BS to a UE. For example, the BS may configure, for the UE, the number of PDCCH candidates at each aggregation level L, a periodicity of monitoring a search space, a search space monitoring occasion performed in units of symbols within a slot, a search space type (a common search space or a UE-specific search space), a combination of an RNTI and a DCI format, which is to be monitored in a corresponding search space, the control region index of a control region of which a search space is to be monitored, and the like. For example, the information listed in Table 8 below may be included.

TABLE 8

```
SearchSpace ::=                         SEQUENCE {
    -- Identity of the search space. SearchSpaceId = 0 identifies the
        SearchSpace configured via PBCH (MIB) or ServingCellConfigCommon.
    searchSpaceId                       SearchSpaceId,
    controlResourceSetId                ControlResourceSetId,
    monitoringSlotPeriodicityAndOffset      CHOICE {
        sl1                             NULL,
        sl2                             INTEGER (0..1),
        sl4                             INTEGER (0..3),
        sl5                         INTEGER (0..4),
        sl8                             INTEGER (0..7),
        sl10                            INTEGER (0..9),
        sl16                            INTEGER (0..15),
        sl20                            INTEGER (0..19)
    }
    monitoringSymbolsWithinSlot             BIT STRING (SIZE (14))
    nrofCandidates                      SEQUENCE {
        aggregationLevel1               ENUMERATED {n0, n1, n2, n3, n4,
            n5, n6, n8},
        aggregationLevel2               ENUMERATED {n0, n1, n2, n3, n4,
            n5, n6, n8},
        aggregationLevel4               ENUMERATED {n0, n1, n2, n3, n4,
            n5, n6, n8},
        aggregationLevel8               ENUMERATED {n0, n1, n2, n3, n4,
            n5, n6, n8},
        aggregationLevel16                  ENUMERATED {n0, n1, n2, n3,
            n4, n5, n6, n8}
    },
    searchSpaceType                     CHOICE {
```

TABLE 8-continued

```
-- Configures this search space as common search space (CSS) and
DCI formats to monitor.
    common                          SEQUENCE {
    }
    ue-Specific                     SEQUENCE {
    -- Indicates whether the UE monitors in this USS for DCI formats
    0-0 and 1-0 or for formats 0-1 and 1-1.
        formats                     ENUMERATED {formats0-0-And-
    1-0, formats0-1-And-1-1},
        ...
    }
```

Based on the configuration information, the BS may configure one or multiple search space sets for the UE. For example, the BS may configure one search space set and two search space sets for the UE. In addition, the BS may perform configuration so as to monitor DCI format A scrambled with X-RNTI in the search space set 1 in a common search space, and to monitor DCI format B scrambled with Y-RNTI in the search space set 2 in a UE-specific search space.

According to the configuration information, one or more multiple search space sets may be present in a common search space or a UE-specific search space. For example, search space set #1 and search space set #2 may be configured to be a common search space, and search space set #3 and search space set #4 may be configured to be a UE-specific search space.

A combination of a DCI format and an RNTI, described below, may be monitored in a common search space.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI A combination of a DCI format and an RNTI, described below, may be monitored in a UE-specific search space.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The above-described RNTIs may be based on the definition and the purpose described below.

C-RNTI (cell RNTI): used for scheduling a UE-specific PDSCH

TC-RNTI (temporary cell RNTI): used for scheduling a UE-specific PDSCH

CS-RNTI (configured scheduling RNTI): used for scheduling a semi-statically configured UE-specific PDSCH RA-RNTI (random access RNTI): used for scheduling a PDSCH at a random access stage P-RNTI (paging RNTI): used for scheduling a PDSCH in which paging is transmitted SI-RNTI (system information RNTI): used for scheduling a PDSCH in which system information is transmitted INT-RNTI (interruption RNTI): used for indicating whether to perform puncturing on a PDSCH TPC-PUSCH-RNTI (Transmit Power Control for PUSCH RNTI): used for providing a power control command associated with a PUSCH TPC-PUCCH-RNTI (Transmit Power Control for PUCCH RNTI): used for providing a power control command associated with a PUCCH TPC-SRS-RNTI (Transmit Power Control for SRS RNTI): used for providing a power control command associated with an SRS The DCI formats are defined in Table 9 below.

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, since a plurality of search space sets may be configured based on different parameters (e.g., the parameters in Table 8), the set of search space sets that a UE monitors at each point in time may be different. For example, in case that search space set #1 is configured at X-slot intervals, search space set #2 is configured at Y-slot intervals, and X and Y are different from each other, a UE may monitor both search space set #1 and search space set #2 in a predetermined slot, and may monitor one of search space set #1 and search space set #2 in a predetermined slot.

In a method of determining a search space set that a UE needs to monitor in case that a plurality of search space sets is configured for the UE, the conditions shown below may be considered.

[Condition 1]

The number of PDCCH candidates that are capable of being monitored per slot should not exceed X. The value of X may be different depending on a subcarrier space, and may be defined by, for example, Table 10.

TABLE 10

| $\mu$ | Maximum number of PDCCH candidates per slot and per serving cell (X) |
| --- | --- |
| 0 | 44 |
| 1 | 36 |
| 2 | 22 |
| 3 | 20 |

In the table, a subcarrier spacing may be defined to be $15 \cdot 2^{\mu}$ kHz.

[Condition 2]

The number of CCEs included in the entire search space (i.e., the entire search space is the set of all CCEs corresponding to the union region of multiple search space sets) per slot should not exceed Y. The value of Y may differ depending on a subcarrier space, and may, for example, be as defined in Table 11.

TABLE 11

| μ | Maximum number of CCEs per slot and per serving cell (Y) |
|---|---|
| 0 | 56 |
| 1 | 56 |
| 2 | 48 |
| 3 | 32 |

In the table, a subcarrier spacing may be defined to be $15 \cdot 2^\mu$ kHz.

For ease of description, the situation that satisfies both conditions 1 and 2 at a predetermined point in time may be defined as "condition A". Therefore, the fact that condition A is not satisfied may indicate that at least one of conditions 1 and 2 is not satisfied.

The case that does not satisfy the above mentioned condition A may occur at a predetermined point in time depending on the configurations of search space sets configured by the BS. In case that condition A is not satisfied at a predetermined point in time, a UE may selectively monitor some of the search space sets configured to satisfy condition A at the point in time, and a BS may transmit a PDCCH in the selected search space set.

A method of selecting some search spaces from among all configured search space sets may be as follows.

In case that condition A associated with a PDCCH is not satisfied at a predetermined point in time (slot), a UE (or a BS) may preferentially select a search space set, the search space type of which is set to a common search space, over a search space set, the search space type of which is set to a UE-specific search space, among search space sets existing at the corresponding point in time.

In case that all search space sets configured to be a common search space are selected (i.e., in case that condition A is satisfied even after all search spaces configured to be a common search space are selected), the UE (or the BS) may select search space sets configured to be a UE-specific search space. In this instance, in case that multiple search space sets are configured to be a UE-specific search space, a search space set having a low search space set index may be preferentially selected. By taking priority into consideration, UE-specific search space sets may be selected as long as condition A is satisfied.

Subsequently, a link recovery procedure (also referred to as a beam failure recovery (BFR)) of a 5G communication system will be described.

Figure 6:
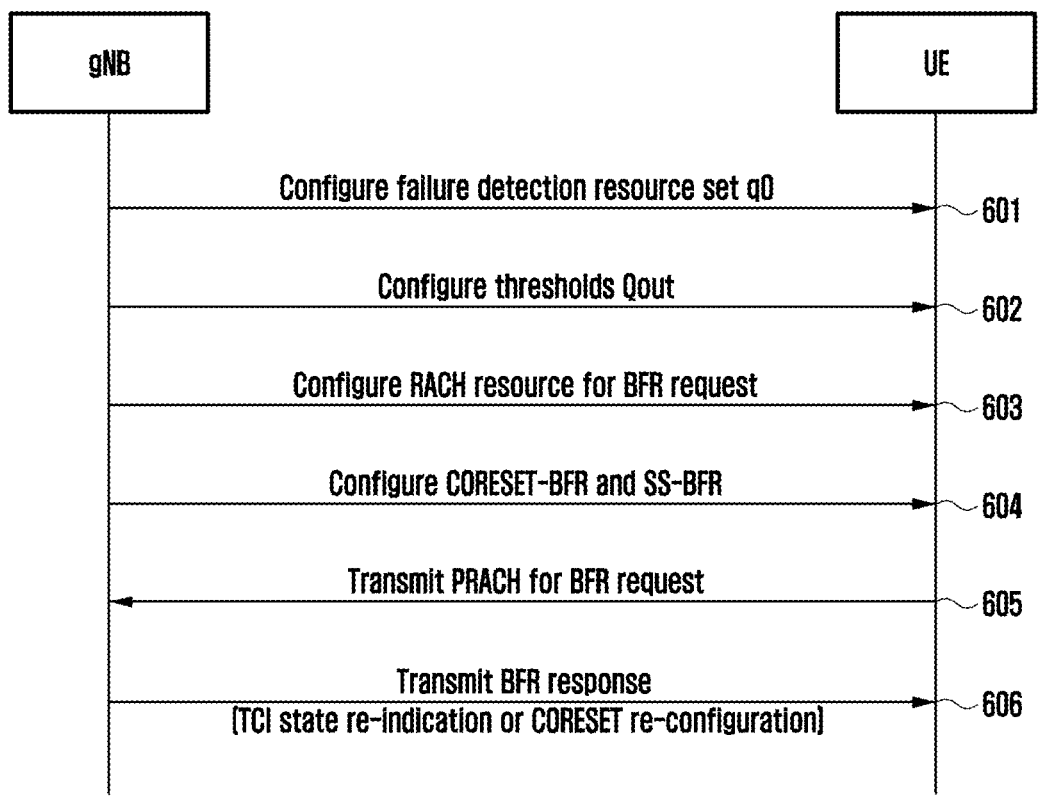
FIG. 6 is a diagram illustrating a beam failure recovery procedure in 5G.

FIG. 6 is a diagram illustrating a beam failure recovery (BFR) procedure in a 5G communication system.

In operation 601, a BS configures, for a UE via higher-layer signaling (e.g., RRC signaling), a periodic channel state information reference signal (CSI-RS) resource configuration index set $q_0$ for detecting a link failure (or a beam failure). In case that the UE does not receive a configuration associated with $q_0$ from the BS, the UE may determine the set $q_0$ based on periodic CSI-RS resource indices or SS/PBCH block indices indicated by TCI states (e.g., TCI states of Table 7) configured in control regions. In operation 602, the BS may configure, for the UE via higher-layer signaling (e.g., RRC signaling), a threshold value $Q_{out}$ for detecting a link failure. In operation 603, the BS may configure, for the UE via higher-layer signaling (e.g., RRC signaling), a random access channel (RACH) resource for transmitting a BFR request message. In operation 604, the BS may configure, for the UE via higher-layer signaling (e.g., RRC signaling) a control region-BFR (CORESET-BFR) and a search space-BFR (SS-BFR) for receiving a PDCCH for a BFR response. In this instance, the BS may perform configuration for the UE so that the UE monitors a DCI format scrambled with a C-RNTI, which is a part of the configuration of a search space.

The UE may measure a link quality at a CSI-RS resource (or an SS/PBCH block) corresponding to an index included in the set $q_{-0}$ configured in operation 601 (or determined based on the TCI state of a control region). The UE may compare the measured link quality value and the threshold value $Q_{out}$ configured in operation 602. In case that the link quality values measured at all resource-for-management configured based on $q_0$ are lower than the threshold value $Q_{out}$, the UE may determine the case as a link failure or a beam failure.

In case that a link failure is detected, the UE may transmit, to the BS, a BFR request message using one of the RACH resources configured in operation 603, in operation 605. In case that the UE transmits a BFR request message to the BS in slot n, the UE may monitor a DCI, scrambled with a C-RNTI, based on the search space-BFR configuration in the control region-BFR configured in operation 604, during a predetermined period of time from slot n+4.

In case that the BS receives the BFR request message from the UE in operation 605, the BS may transmit a BFR response message to the UE in operation 606. In this instance, the BS may transmit a DCI, scrambled with a C-RNTI, to the control region-BFR and the search space-BFR configured in operation 604. The BS may newly activate the TCI states of control regions configured for the UE via medium access control (MAC) control element (CE) signaling. Alternatively, the BS may inform the UE of reconfiguration associated with a control region via RRC signaling.

In case that the UE is informed of reconfiguration of a TCI for a control region or reconfiguration of a control region via a BFR response message from the BS in operation 606, the UE may stop monitoring of the control region-BFR and the search space-BFR configured in operation 604.

Hereinafter, embodiments of the disclosure will be described in detail with reference to the accompanying drawings. Hereinafter, although embodiments of the disclosure will be described with reference to the 5G system, the embodiments of the disclosure may be applicable to other communication systems having a similar technical background or using a similar kind of channel. For example, mobile technologies developed after LTE, LTE-A, and 5G mobile communication will be included. Therefore, embodiments of the disclosure may be modified without departing from the scope of the disclosure, and may be applied to other communication systems, based on the determination by those skilled in the art.

In the following description of the disclosure, a detailed description of known functions or configurations incorporated herein will be omitted when it may make the subject matter of the disclosure rather unclear. The terms which will be described below are terms defined in consideration of the functions in the disclosure, and may differ according to users, intentions of the users, or customs. Therefore, the definitions of the terms should be made based on the contents throughout the specification.

Embodiment 1

Embodiment 1 of the disclosure provides a method of monitoring a control region and a search space for receiving a PDCCH, by a UE, in a link recovery process after a link failure occurs.

In the following description, monitoring of a control region means an operation of monitoring, by a UE, a control region and a search space set configured in the control region.

Figure 7:
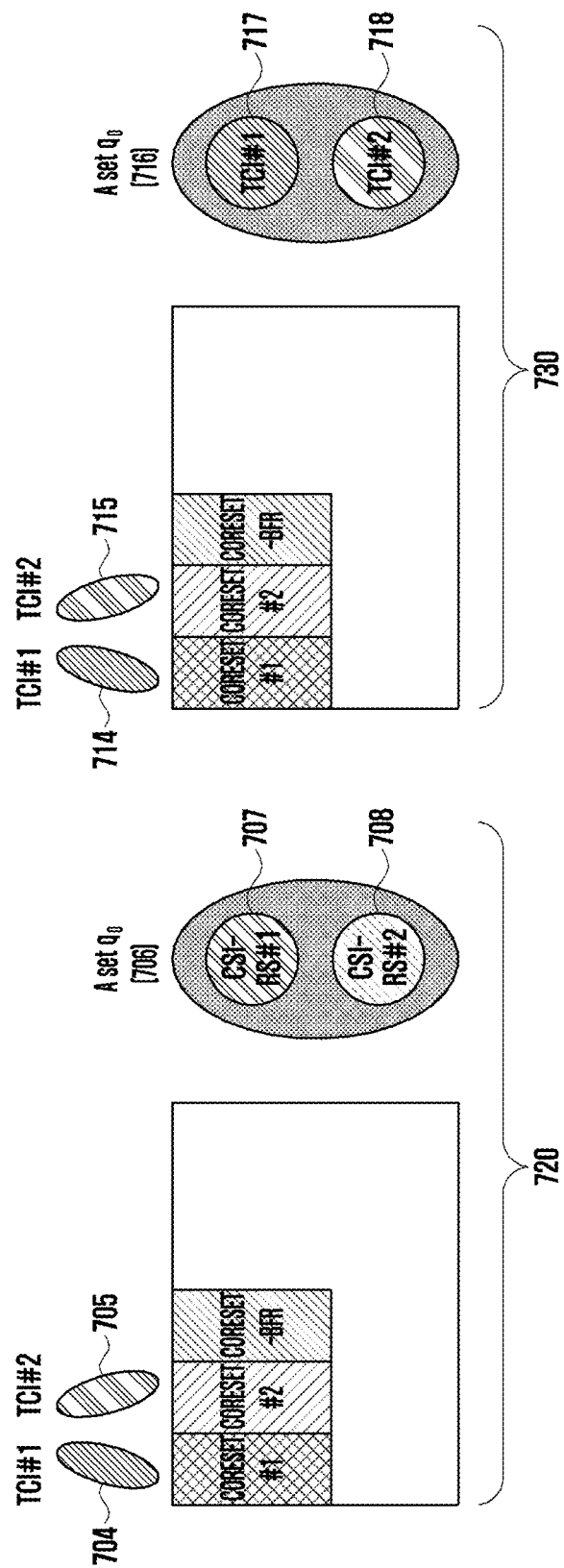
FIG. 7 is a diagram illustrating an example of the configuration of a reference signal and the configuration of a control region for a beam failure recovery procedure in 5G.

FIG. 7 is a diagram illustrating an example of the configuration of a control region for a beam failure recovery (BFR) procedure and the configuration of a resource-for-measurement for detecting a link failure. A beam failure recovery procedure will be described with reference to the beam failure recovery procedure that was described with reference to FIG. 6.

The example of a configuration in diagram 720 of FIG. 7 will be described.

In the example of diagram 720 of FIG. 7, control region #1 701 and control region #2 702 are configured, and TCI states respectively corresponding to TCI #1 704 and TCT #2 705 are configured. In addition, a control region-BFR 703 is configured in order to receive a BFR response message when a link failure occurs. Resources-for-measurement $q_0$ 706 used for detecting a link failure may be configured, and the resource index set $q_0$ 706 may include resource indices corresponding to a periodic CSI-RS #1 707 and CSI-RS #2 708. A UE may measure resource regions corresponding to the CSI-RS #1 707 and the CSI-RS #2 708 in order to detect a link failure. In case that the link qualities of both the CSI-RS #1 707 and the CSI-RS #2 708 are lower than a threshold value $Q_{out}$, the UE may transmit a BFR request message to a BS. After transmitting the BFR request message in slot n, the UE may monitor the control region-BFR 703 (and a corresponding search space-BFR), which is configured in advance in order to receive a BFR response message, during a predetermined period of time from slot n+4.

In the example of diagram 720, even though the UE determines that a link failure occurs (e.g., in case that qualities measured at all resources within the resource set $q_0$ 706 are lower than the threshold value), the UE cannot determine that the link qualities of control region #1 701 and control region #2 702, that is, the qualities of TCI #1 704 and TCT #2 705, are also poor. The UE may not clearly identify whether there is a correlation (or Quasi-co-located (QCL) relationship) between CSI-RS #1 707 and CSI-RS #2 708 in the resource set $q\text{-}_0$ 706 and TCI #1 704 and TCI #2 705 of the control regions 704 and 705. That is, although the link qualities of all resources in the configured resource set $q\text{-}_0$ 706 are lower than the threshold value, the link qualities of control region #1 701 and control region #2 702, which are configured in advance, may be good enough to receive a PDCCH, depending on the situation. Therefore, it is preferable that the UE continuously monitors other control regions, that is, control region #1 701 and control region #2 702, while monitoring the control region-BFR 703 for link recovery after detecting a link failure.

The example configuration shown in diagram 730 of FIG. 7 will be described.

In the example in diagram 730 of FIG. 7, control region #1 711 and control region #2 712 are configured, and TCI states corresponding to TCI #1 714 and TCT #2 715 are configured, respectively. In addition, a control region-BFR 713 is configured to receive a BFR response message when a link failure occurs. In diagram 730, it is assumed that resources-for-measurement $q_0$ 716 for detecting a link failure is not configured. Therefore, the resource index set $q_0$ 716 may include a set of TCI states of control regions. That is, the set $q_0$ 716 is configured to be the same as a set of CSI-RS indices or SS/PBCH indices corresponding to TCI #1 714, which is the TCI state of control region #1 711, and TCI #2 715, which is the TCI state of control region #2 712. In brief, FIG. 7 illustrates that the set $q_0$ 716 includes a set of indices corresponding to TCI #1 717 and TCI #2 718. The UE may measure resource regions corresponding to the TCI #1 717 and TCI #2 718 in order to detect a link failure. In case that it is determined that the link qualities of both the TCI #1 717 and the TCI #2 718 are lower than a threshold value $Q_{out}$, the UE may transmit a BFR request message to a BS. After transmitting the BFR request message in slot n, the UE may monitor the control region-BFR 713 (and a corresponding search space-BFR), configured in advance in order to receive a BFR response message, during a predetermined period of time from slot n+4.

In the example of diagram 730, in case that the UE determines that a link failure occurs (e.g., in case that qualities measured at all resources within the resource set $q_0$ 716 are lower than the threshold value), this may indicate that the link qualities of control region #1 711 and control region #2 712, that is, the qualities of TCI #1 714 and TCT #2 715, are also poor. Therefore, in case that the UE monitors other control regions (e.g., control region #1 711 and control region #2 712) while monitoring the control region-BFR 713 in order to perform link recovery after detecting a link failure, it is considered that the UE unnecessarily performs blind decoding. Accordingly, this is not desirable.

Accordingly, a UE's PDCCH monitoring operation, that is, whether to continuously monitor control regions that the UE monitored before detecting a link failure, while the UE monitors the control region-BFR, may differ depending on the BS's configuration information, for example, whether resource set $q_0$ is configured (or the configuration of the resource set $q_0$).

Figure 8:
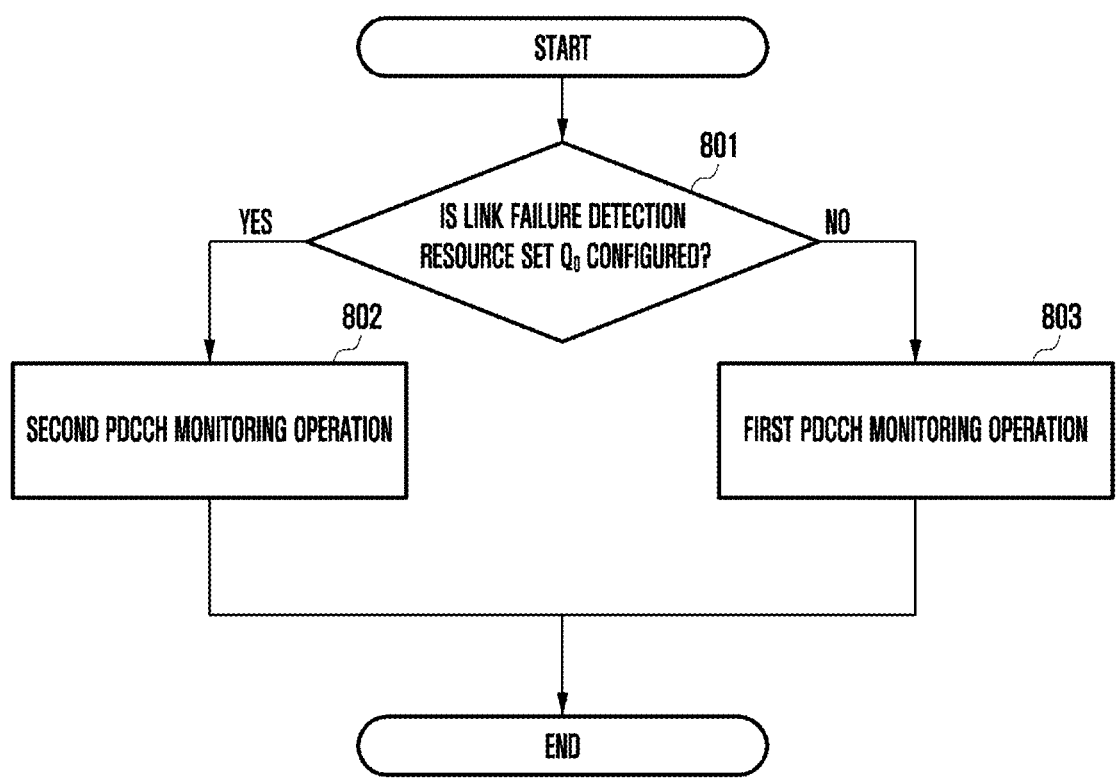
FIG. 8 is a diagram illustrating Embodiment 1 of the disclosure.

FIG. 8 is a diagram illustrating Embodiment 1 of the disclosure.

The UE may determine whether configuration information associated with a resource set $q_0$ for detecting a link failure is received from a BS in operation 801. In case that the set $q_0$ is configured, the UE may perform a "second PDCCH monitoring operation" in operation 802. The second PDCCH monitoring operation may correspond to at least one of the methods provided below. In case that the set $q_0$ is not configured, the UE may perform a "first PDCCH monitoring operation" in operation 803. The second PDCCH monitoring operation may be as follows.

For example, the first PDCCH monitoring operation and the second PDCCH monitoring operation may be as follows.

<First PDCCH Monitoring Operation>
  during a time interval for monitoring a control region-BFR, not monitoring other control regions configured in advance (control regions which were monitored before a link failure was detected), and monitoring only the control region-BFR <Second PDCCH Monitoring Operation>
  during a time interval for monitoring a control region-BFR, also monitoring other control regions configured in advance (i.e., control regions which were monitored before a link failure was detected)

As another example, the first PDCCH monitoring operation and the second PDCCH monitoring operation may be as follows.

<First PDCCH Monitoring Operation>
  during a time interval for monitoring a control region-BFR, monitoring a control region, the search space type of which is set to a common search space, among other control regions configured in advance (i.e., control regions which were monitored before a link failure was detected)

<Second PDCCH Monitoring Operation>
  during a time interval for monitoring a control region-BFR, also monitoring other control regions configured in advance (i.e., control regions which were monitored before a link failure was detected)

As another example, the first PDCCH monitoring operation and the second PDCCH monitoring operation may be as follows.

<First PDCCH Monitoring Operation>
  during a time interval for monitoring a control region-BFR, not monitoring other control regions configured in advance (control regions which were monitored before a link failure was detected), and monitoring only the control region-BFR <Second PDCCH Monitoring Operation>
  during a time interval for monitoring a control region-BFR, monitoring a control region, the search space type of which is set to a common search space, among other control regions configured in advance (i.e., control regions which were monitored before a link failure was detected)

Embodiment 1-1

In Embodiment 1-1, a PDCCH monitoring operation by a UE may be controlled differently depending on the configuration of a resource set $q_0$. For example, as a criterion for determining a control region to be additionally monitored while a UE monitors a control region-BFR, whether a CSI-RS resource, which is in a QCL relationship with a DMRS in a control region, is present among CSI-RS resources included in the resource set $q_0$ configured for detecting a link failure (or whether a CSI-RS resource is the same as an RS indicated by a TCI configured in the control region) may be considered.

Figure 9:
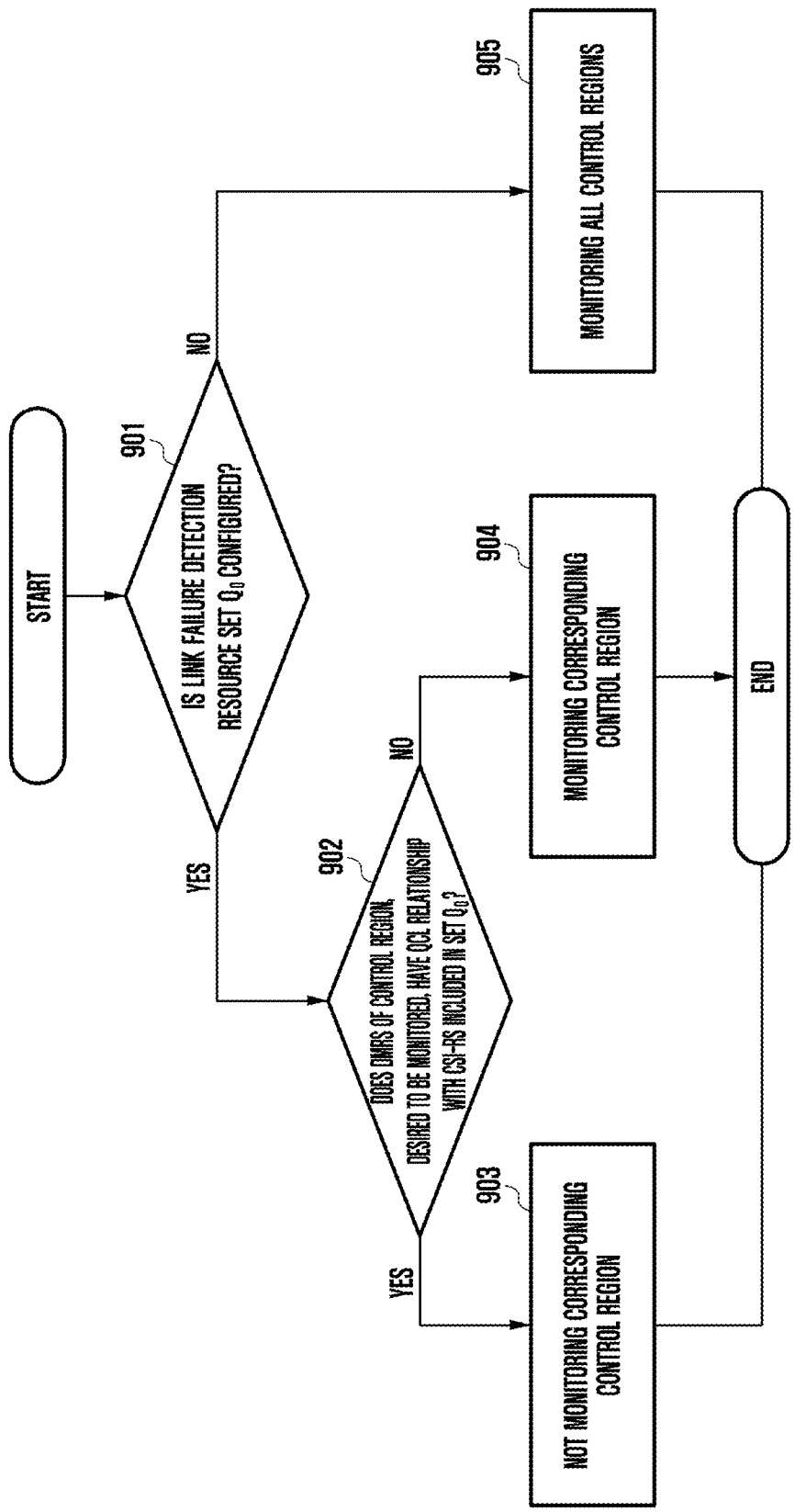
FIG. 9 is a diagram illustrating Embodiment 1-1 of the disclosure.

FIG. 9 is a diagram illustrating Embodiment 1-1 of the disclosure.

The UE may determine whether configuration information associated with a resource set $q_0$ for detecting a link failure is received from a BS in operation 901.

In case that the set $q_0$ is configured in operation 901, the UE may determine whether a CSI-RS resource, which is in a QCL relationship with a DMRS of a control region in association with a predetermined control region, is present in the set $q_0$ in operation 902. In case that it is determined that a CSI-RS resource that is in a QCL relationship with the DMRS of the control region is present in the set $q_0$ in operation 902, the UE may not perform monitoring on the control region determined in operation 902 while monitoring a control region-BFR in operation 903. In case that it is determined that a CSI-RS resource that is in a QCL relationship with the DMRS of the control region is not present in the set $q_0$ in operation 902, the UE may perform monitoring on the control region determined in operation 902 while monitoring the control region-BFR in operation 904.

In case that the set $q_0$ is not configured, the UE may perform monitoring on all other control regions configured in advance while monitoring the control region-BFR, in operation 905. Alternatively, the UE may perform the second PDCCH monitoring operation defined in Embodiment 1.

Embodiment 1-2

During a time interval in which a UE monitors a control region-BFR, the UE may not monitor other control regions configured in advance (control regions which were monitored before a link failure was detected), and may always monitor only the control region-BFR.

Embodiment 1-3

During a time interval in which a UE monitors a control region-BFR, the UE may monitor a control region, the search space type of which is set to a common search space, among other control regions configured in advance (i.e., control regions which were monitored before a link failure was detected).

Embodiment 1-4

During a time interval in which a UE monitors a control region-BFR, the UE may also monitor other control regions configured in advance (i.e., control regions which were monitored before a link failure was detected).

Embodiment 2

During a time interval in which a UE monitors a control region-BFR, the UE may monitor some or all of other control regions configured in advance (i.e., control regions which were monitored before a link failure was detected). In this instance, a case that does not satisfy the above-mentioned "condition A" may occur at a predetermined point in time. In this instance, to satisfy condition A, the UE may selectively monitor some of all search space sets configured to be monitored (in the same manner, and a BS may transmit a PDCCH in the selected search space sets).

A method of selecting some search spaces from all configured search space sets may be as follows.

[Method 1]

During a time interval in which a UE monitors a control region-BFR, the UE may monitor some or all of other control regions configured in advance (i.e., control regions which were monitored before a link failure was detected). In this instance, in case that condition A associated with a PDCCH is not satisfied at a predetermined point in time (slot) (in case that at least one of condition 1 or condition 2 is not satisfied, that is, at least one of the case in which the number of PDCCH candidates capable of being monitored in a predetermined slot exceeds X of condition 1, or the case in which the number of CCEs included in the entire search space exceeds Y of condition 2 in a predetermined slot), the UE and a BS may operate as follows.

The UE and the BS may preferentially select a search space set (i.e., a search space-BFR) configured in a control region-BFR over other search space sets, among search space sets desired to be monitored at the corresponding point in time. In case that condition A is satisfied even after selecting the search space set configured in the control region-BFR, the UE and the BS may additionally select a search space set configured to be a common search space. In case that condition A is satisfied even after selecting all search spaces configured to be the common search space, the UE and the BS may additionally select search space sets configured to be a UE-specific search space. In this instance, in case that multiple search space sets are configured to be a UE-specific search space, a search space set having a lower search space set index may have a higher priority. By taking into consideration priority, UE-specific search space sets may be selected as long as condition A is satisfied.

According to method 1, a control region-BFR is preferentially monitored, and thus a recovery procedure may be more quickly performed when a link failure is detected.

[Method 2]

During a time interval in which a UE monitors a control region-BFR, the UE may monitor some or all of other control regions configured in advance (i.e., control regions which were monitored before a link failure was detected). In this instance, in case that condition A associated with a PDCCH is not satisfied at a predetermined point in time (slot), the UE and a BS may preferentially select a search space set configured to be a common search space among search space sets desired to be monitored at the corresponding point in time. In case that condition A is satisfied even after selecting the search space set configured to be the common search space, the UE and the BS may preferentially select a search space set (i.e., a search-space BFR), configured in a control region-BFR, over other search space sets configured to be a UE-specific search space. In case that condition A is satisfied even after selecting the search space set configured in the control region-BFR, the UE and the BS may additionally select search space sets configured to be a UE-specific search space. In this instance, in case that multiple search space sets are configured to be a UE-specific search space, a search space set having a lower search space set index may have a higher priority. By taking into consideration priority, UE-specific search space sets may be selected as long as condition A is satisfied.

According to method 2, monitoring of a common search space is maximally secured, and thus the greatest possible variety of downlink control information which may be transmitted in the common search space may be received. For example, communication with the BS may be continuously supported using a DCI format scrambled with a C-RNTI transmitted in the common search space.

[Method 3]

During a time interval in which a UE monitors a control region-BFR, the UE monitors some or all of other control regions configured in advance (i.e., control regions which were monitored before a link failure was detected). In this instance, in case that condition A associated with a PDCCH is not satisfied at a predetermined point in time (slot), the UE and a BS may preferentially select a search space set, the search space type of which is set to a common search space, over a search space set configured to be a UE-specific search space, among search space sets desired to be monitored at the corresponding point in time.

In case that all search space sets configured to be a common search space are selected (i.e., in case that condition A is satisfied even after all search spaces configured to be the common search space are selected), the UE and the BS may select search space sets configured to be a UE-specific search space including a search space set configured in the control region-BFR. In this instance, in case that multiple search space sets are configured to be the UE-specific search space, a search space set having a lower search space set index may have a higher priority. By taking into consideration priority, UE-specific search space sets may be selected as long as condition A is satisfied.

According to method 3, monitoring of a common search space is maximally secured, and thus the greatest possible variety of downlink control information that may be transmitted in the common search space may be received. For example, communication with the BS may be continuously supported using a DCI format scrambled with a C-RNTI transmitted in the common search space. In addition, irrespective of a search space set configured in the control region-BFR, the priorities of all UE-specific search spaces are determined by the BS (i.e., the BS assigns a search space set index based on a desired priority sequence). Accordingly, the flexibility of system operation may be increased.

Embodiment 3

Figure 10:
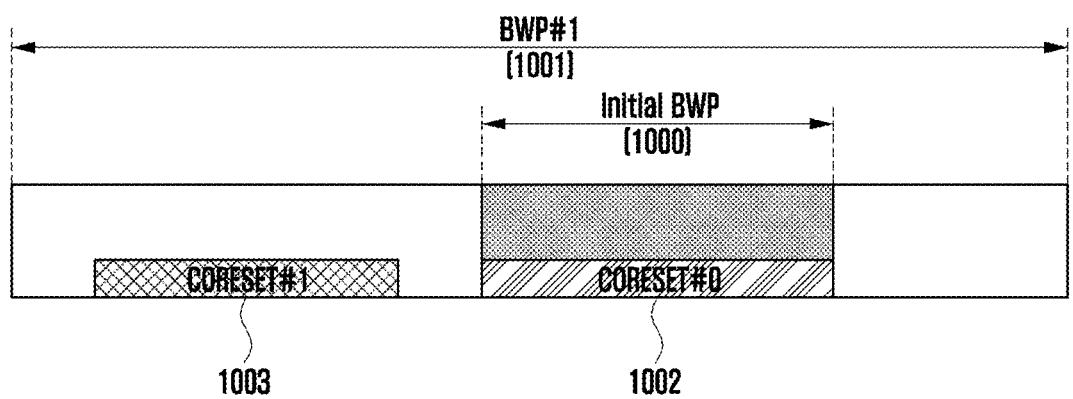
FIG. 10 is a diagram illustrating an example of the configuration of a bandwidth part in 5G.

FIG. 10 is a diagram illustrating an example of the configuration of a bandwidth part.

A user equipment (UE) may be configured with an initial bandwidth part 1000 by a base station (BS) via an MIB. As described above, the initial bandwidth part may correspond to the same frequency-axis band as that of control region #0 1002 configured by the MIB. The UE may be additionally configured with a bandwidth part (e.g., bandwidth part #1 1001 of FIG. 10) via UE-specific RRC signaling. In addition, the UE may be additionally configured with a control region to be monitored in the corresponding bandwidth part via UE-specific RRC signaling (e.g., control region #1 of FIG. 10).

The example of FIG. 10 illustrates the situation in which bandwidth part #1 1001 includes the initial bandwidth part 1000. In this instance, in order to enable the UE to monitor control region #0 1002 (or a control region having the same configuration as that of control region #0 1002) in the bandwidth part #1 1001, the BS needs to configure control region #0 1002 (or the control region having the same configuration as that of control region #0 1002) as a control region of the bandwidth part #1 1001. However, depending on the case, configuring a control region, which is the same as a control region configured by the MIB, via UE-specific RRC may not be allowed.

Figure 11:
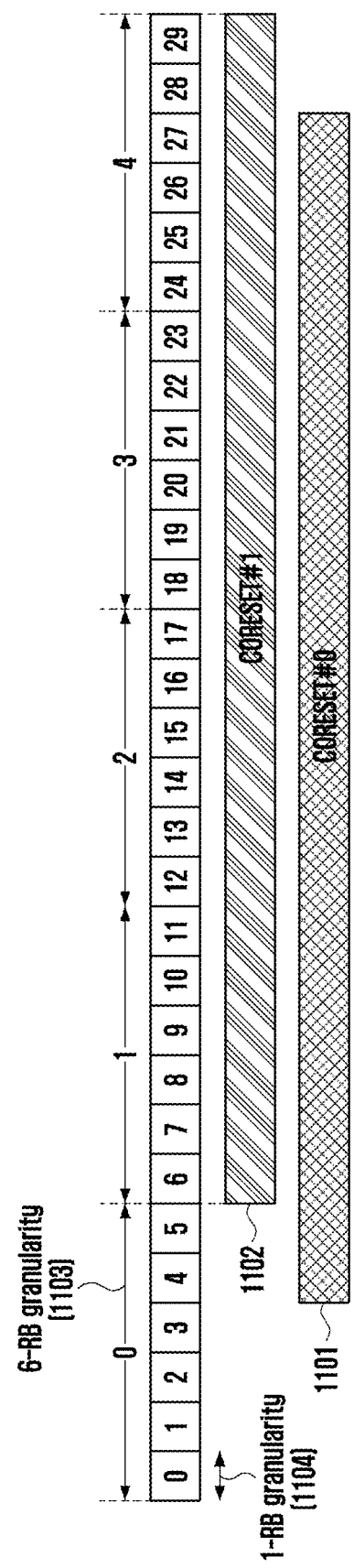
FIG. 11 is a diagram illustrating an example of the configuration of a control region in 5G.

FIG. 11 is a diagram illustrating an example of the situation in which a control region that is the same as a control region configured by an MIB is not configurable via UE-specific RRC. In FIG. 11, control region #0 1101 is a control region configured by an MIB, and control region #1 1102 is a control region configured via UE-specific RRC. According to FIG. 11, in association with allocation on the frequency axis, control region #0 1101 configured by the MIB may be configured based on a 1-RB unit 1104. However, control region #1 1102 configured via UE-specific RRC may be configured based on a 6-RB unit 1103. Therefore, in the example of FIG. 11, control region #0 1101 configured by the MIB is allocated from a fifth RB, and thus control region #1 1102, including the same allocation on the frequency axis, is not configurable via UE-specific RRC.

In order to overcome the drawback, Embodiment 2 of the disclosure provides a method of configuring a control region, which is the same as a control region configured by an MIB, via UE-specific RRC signaling.

Before describing an embodiment, control region parameters which may be configured via RRC signaling will be described again (see Table 7).

TABLE 12

ControlResourceSet IE (Information Element)

Control region identity (ID)
Frequency-axis resource assignment information
Time-axis resource assignment information
CCE-to-REG mapping type
REG bundle size
Interleaver size
Interleaver shift
TCI state (QCL configuration information)
TCI-PresentInDCI In the case in which a bandwidth part (referred to as bandwidth part #1), configured via UE-specific RRC, is configured to include an initial bandwidth part (referred to as bandwidth part #0), configuration may be made such that a control region, configured by an MIB, that is, control region #0 (or a control region having the same configuration as control region #0 1002) is monitored in the bandwidth part #1 according to the following method.

[Method 1]

A BS may configure, for a UE via UE-specific RRC, a control region to be monitored in bandwidth part #1. In this instance, in order to configure a control region having the same configuration as a control region (e.g., control region #0) configured by an MIB, the BS may configure a control region for the UE via RRC signaling. In this instance, the BS may inform the UE of only a control region identity among the parameters of Table 12. In case that the UE is informed of only the control region identity among the control region configuration parameters, by the BS via RRC signaling, the UE may regard the configured control region as a control region having the same configuration as that of the control region (i.e., control region #0) configured by the MIB. Therefore, the UE may monitor the control region having the same configuration as that of control region #0 in the bandwidth part #1.

[Method 2]

A BS may configure, for a UE via UE-specific RRC, a control region to be monitored in bandwidth part #1. In this instance, in order to configure a control region having the same configuration as a control region (e.g., control region #0) configured by an MIB, the BS may configure a control region for the UE via RRC signaling. In this instance, the BS may not inform the UE of only frequency-axis allocation information among the parameters of Table 12. In case that the UE is not informed of the frequency-axis resource allocation information among the control region configuration parameters, by the BS via RRC signaling, the UE may regard the configured control region as a control region having the same configuration (the same frequency-axis allocation information) as that of the control region (i.e., control region #0) configured by the MIB. Therefore, the UE may monitor the control region having the same configuration as that of control region #0 in the bandwidth part #1.

In this instance, the remaining parameters configured via RRC, excluding the frequency-axis resource allocation information, may be configured to always be the same as the configuration of control region #0 configured by the MIB. In case that the UE is informed of a parameter that is different from the configuration of control region #0, the UE may determine that the RRC configuration has an error.

Alternatively, the remaining parameters, excluding the frequency-axis resource allocation information and TCI state configuration information, among the parameters configured via RRC, may be configured to be always the same as the configuration of control region #0 configured by the MIB. In case that the UE is informed of the remaining parameters including a parameter that is different from the configuration of control region #0, the UE may determine that the RRC configuration has an error. In addition, the TCI state may be configured to be a reference signal set (SS/PBCH block index or CSI-RS resource index) including an SS/PBCH block index associated (association) with control region #0 configured by the MIB.

[Method 3]

A BS may configure, for a UE via UE-specific RRC, a control region to be monitored in bandwidth part #1. In this instance, when the BS configures a control region for the UE via RRC signaling in order to configure a control region having the same configuration as a control region (e.g., control region #0) configured by an MIB, the BS may not inform the UE of only the frequency-axis allocation information among the parameters of Table 12. In case that the UE is not informed of only the frequency-axis resource allocation information among the control region configuration parameters, by the BS via RRC signaling, the UE may regard the configured control region as a control region having the same configuration (the same frequency-axis allocation information) as that of the control region (i.e., control region #0) configured by the MIB. Therefore, the UE may monitor the control region having the same configuration as that of control region #0 in the bandwidth part #1.

In this instance, the remaining parameters configured via RRC, excluding the frequency-axis resource allocation information, may be configured to always be the same as the configuration of control region #0 configured by the MIB. In case that the UE is informed of a parameter that is different from the configuration of control region #0, the UE may determine that the RRC configuration has an error.

Alternatively, the remaining parameters, excluding the frequency-axis resource allocation information and TCI state configuration information, among the parameters configured via RRC, may be configured to be always the same as the configuration of control region #0 configured by the MIB. In case that the UE is informed of the remaining parameters including a parameter that is different from the configuration of control region #0, the UE may determine that the RRC configuration has an error. In addition, the TCI state may be configured to be a reference signal set (SS/PBCH block index or CSI-RS resource index) including an SS/PBCH block index associated (association) with control region #0 configured by the MIB.

[Method 4]

A BS may configure, for a UE via UE-specific RRC, a control region to be monitored in bandwidth part #1. In this instance, when the BS configures a control region for the UE via RRC signaling in order to configure a control region having the same configuration as a control region (e.g., control region #0) configured by an MIB, the BS may inform the UE of a predetermined state in which frequency-axis allocation information is not used among the parameters of Table 12. The frequency-axis allocation information associated with the control region may be reported to the UE via a 45-bit bit string, as shown below.

frequencyDomainResources BIT STRING (SIZE (45)),

The BS may indicate, to the UE, all the frequency-axis allocation information as "0" (i.e., '0000 . . . 0').

In case that the UE is informed that all of the pieces of frequency-axis resource allocation information are "0" among the control region configuration parameters, by the BS via RRC signaling, the UE may regard the configured control region as a control region having the same configuration (the same frequency-axis allocation information) as that of the control region (i.e., control region #0) configured by the MIB. Therefore, the UE may monitor the control region having the same configuration as that of control region #0 in the bandwidth part #1.

In this instance, the remaining parameters configured via RRC, excluding the frequency-axis resource allocation information, may be configured to always be the same as the configuration of control region #0 configured by the MIB. In case that the UE is informed of a parameter that is different from the configuration of control region #0, the UE may determine that the RRC configuration has an error.

Alternatively, the remaining parameters, excluding the frequency-axis resource allocation information and TCI state configuration information, among the parameters configured via RRC, may be configured to always be the same as the configuration of control region #0 configured by the MIB. In case that the UE is informed of the remaining parameters including a parameter that is different from the configuration of control region #0, the UE may determine that the RRC configuration has an error. In addition, the TCI state may be configured to be a reference signal set (SS/PBCH block index or CSI-RS resource index) including an SS/PBCH block index associated (association) with control region #0 configured by the MIB.

Embodiment 4

A BS may configure control regions having the same identity (ID) in different bandwidth parts when configuring a control region in each bandwidth part. A UE may be configured with a control region having an ID of 0, that is, control region #0, by an MIB at the initial access stage. Therefore, configuring a control region having an ID of 0 in another bandwidth part configured via UE-specific RRC, as opposed to the initial bandwidth part, may be restricted. Embodiment 4 of the disclosure provides a method of configuring a control region having a control region ID of 0, via UE-specific RRC, and replacing control region #0 configured by an MIB.

Before describing the embodiment of the disclosure, the configuration of a bandwidth part of 5G will be described in detail.

Figure 12:
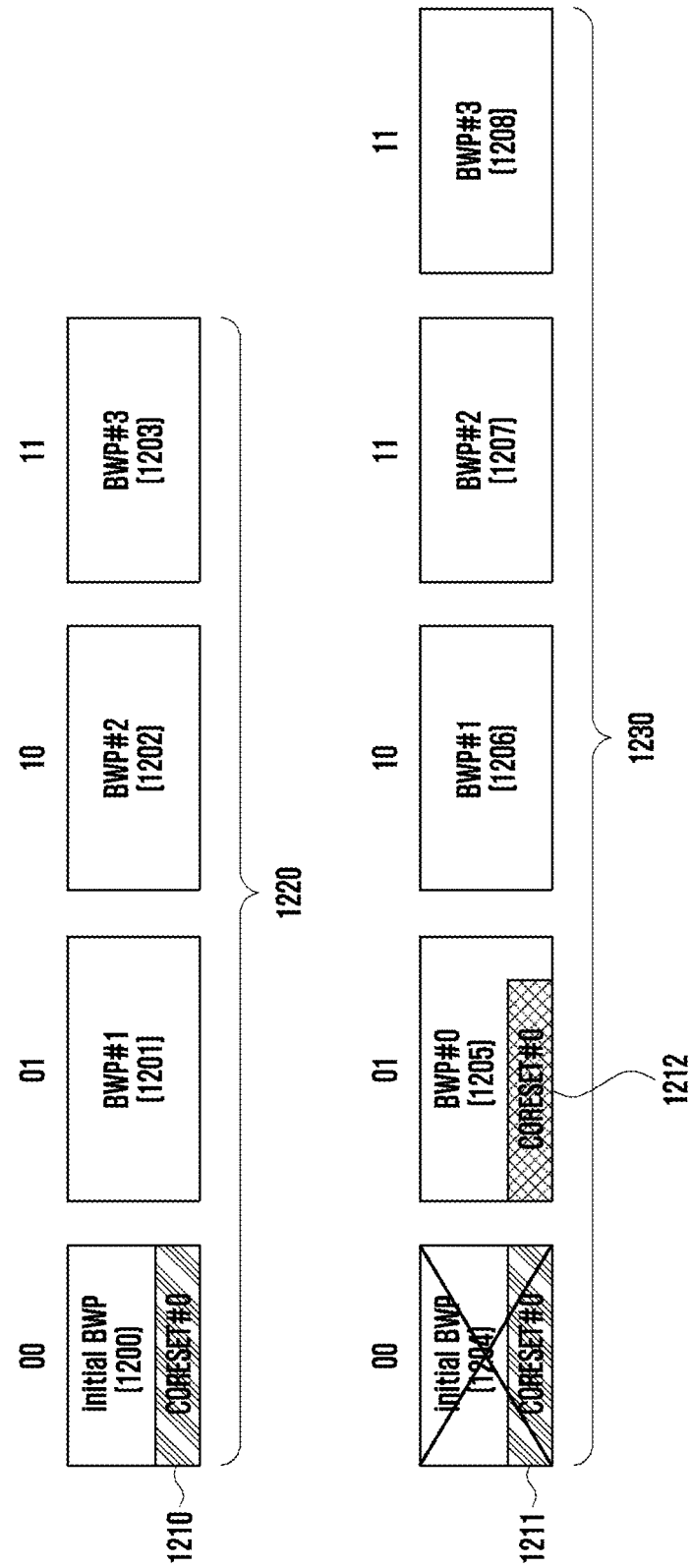
FIG. 12 is a diagram illustrating an example of the configuration of a bandwidth part in 5G.

FIG. 12 is a diagram illustrating an example of the configuration of a bandwidth part.

A UE may be configured with a maximum of four bandwidth parts by a BS via higher-layer signaling, for example, UE-specific RRC signaling. The number of bits of a bandwidth part indicator (see Table 4 and Table 6) of a DCI may be determined based on the number of configured bandwidth parts. In this instance, a bandwidth indicator field may be interpreted differently depending on the number of bandwidth parts configured via UE-specific RRC. In case that the number of bandwidth parts configured via UE-specific RRC is less than 4, the initial bandwidth part configured by an MIB may be automatically included in a bandwidth part that may be indicated by a bandwidth part indicator, and may correspond to a bit field indicator of "0" or "00" (i.e., corresponding to the fact that a bandwidth part ID is 0). In other words, it may be understood to be the same as the case in which, in case that the number of bandwidth parts configured via UE-specific RRC is less than 4, the initial bandwidth part is regarded as one of the configured bandwidth parts. In case that the number of bandwidth parts configured via UE-specific RRC is 4, each of the four bandwidth parts configured via RRC may correspond to a bandwidth part indicator bit field corresponding to 2 bits.

Diagram 1220 of FIG. 12 illustrates an example in which a total of three bandwidth parts 1201, 1202, and 1203 are configured via UE-specific RRC. In this instance, it is considered that a total of four bandwidth parts including an initial bandwidth part 1200 are configured, and each bandwidth part corresponds to a bandwidth part indicator of 2 bits. As shown in diagram 1220 of FIG. 12, the initial bandwidth part 1200 may correspond to "00", bandwidth part #1 1201 may correspond to "01", bandwidth part #2 1202 may correspond to "10", and bandwidth part #3 1203 may correspond to "11", respectively.

Diagram 1230 of FIG. 12 illustrates an example in which a total of four bandwidth parts 1205, 1206, 1207, and 1208 are configured via UE-specific RRC. In this instance, it is considered that a total of four bandwidth parts, including the initial bandwidth part 1200, are configured, and that each bandwidth part corresponds to a bandwidth part indicator of 2 bits. As shown in diagram 1230 of FIG. 12, bandwidth part #0 1205 may correspond to "00", bandwidth part #1 1206 may correspond to "01", bandwidth part #2 1207 may correspond to "10", and bandwidth part #3 1208 may correspond to "11", respectively.

As described above, in case that the number of bandwidth parts configured by the BS via UE-specific RRC is less than 4, it is automatically considered that a bandwidth part configured by an MIB is one of the configured bandwidth parts. In this instance, the initial bandwidth part always includes a control region configured by an MIB, that is, control region #0 (a control region having an identifier (ID) of 0), and thus the UE automatically includes control region #0 when configuring a control region. Therefore, the BS is incapable of configuring, for the UE, a control region having an identifier of 0 in other bandwidth parts configured by UE-specific RRC.

Figure 13:
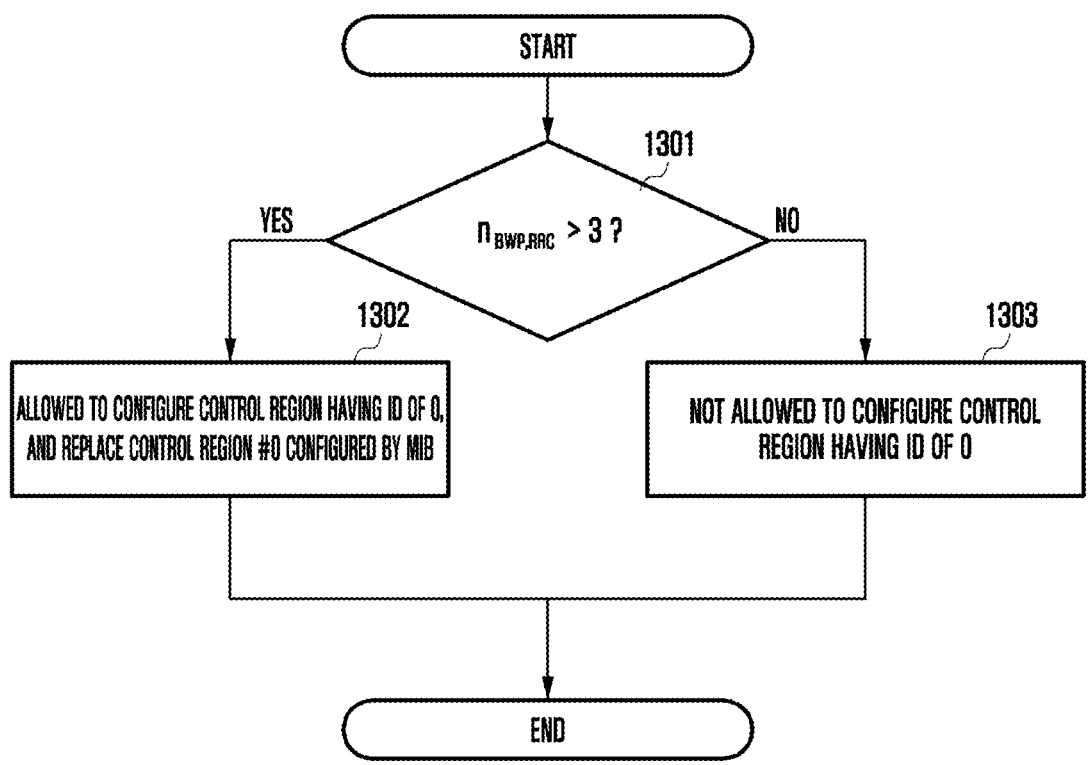
FIG. 13 is a diagram illustrating Embodiment 4 of the disclosure.

FIG. 13 is a diagram illustrating Embodiment 4 of the disclosure.

A UE may determine whether the number of bandwidth parts ($n_{BWP,RRC}$) configured via UE-specific RRC is greater than 3 in operation 1301. In case that $n_{BWP,RRC}$ is greater than 3 in operation 1301, the UE may be configured with a control region having an ID of 0 by the BS via UE-specific RRC in operation 1302. In case that a control region having an ID of 0 is configured, control region #0 configured by an MIB may be disregarded, and may be replaced with control region #0, configured via UE-specific RRC. In case that $n_{BWP,RRC}$=4 is less than or equal to 3 in operation 1301, the UE may not be configured with a control region having an ID of 0 by the BS via UE-specific RRC in operation 1303. In case that a control region having an ID of 0 is configured, the UE may regard the same as an error.

Embodiment 4-1

A BS may always configure a control region having an identifier other than an identifier of 0 when configuring a control region in each bandwidth part. A UE may not expect that a control region having an identifier of 0 is configured in a bandwidth part configured via UE-specific RRC.

Embodiment 4-2

In case that a UE is configured with four bandwidth parts by a BS via UE-specific RRC, and in this instance, at least one bandwidth part is configured to include an initial bandwidth part, the following operation may be performed.

In case that one bandwidth part (referred to as bandwidth part #1) is configured to include an initial bandwidth part, the UE may monitor control region #0, configured by an MIB in bandwidth part #1. That is, the UE may regard control region #0 as one of the control regions configured in bandwidth part #1. In case that bandwidth part #1 of the UE is activated, the BS may transmit a PDCCH via control region #0.

In case that one bandwidth part is configured to include the initial bandwidth part, the UE may monitor control region #0, configured by an MIB, in the bandwidth part having the lowest (or highest) bandwidth part index among bandwidth parts including the initial bandwidth part. Among the bandwidth parts configured for the UE, in case that the bandwidth part having the lowest (or highest) bandwidth part index is activated among the bandwidth parts including the initial bandwidth part, the BS may transmit a PDCCH via control region #0.

Figure 14:
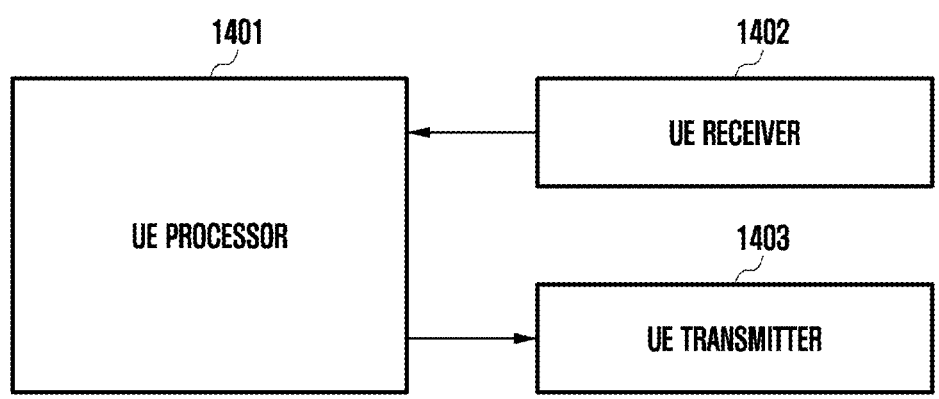
FIG. 14 is a block diagram illustrating the internal structure of a user equipment (UE) according to an embodiment.
Figure 15:
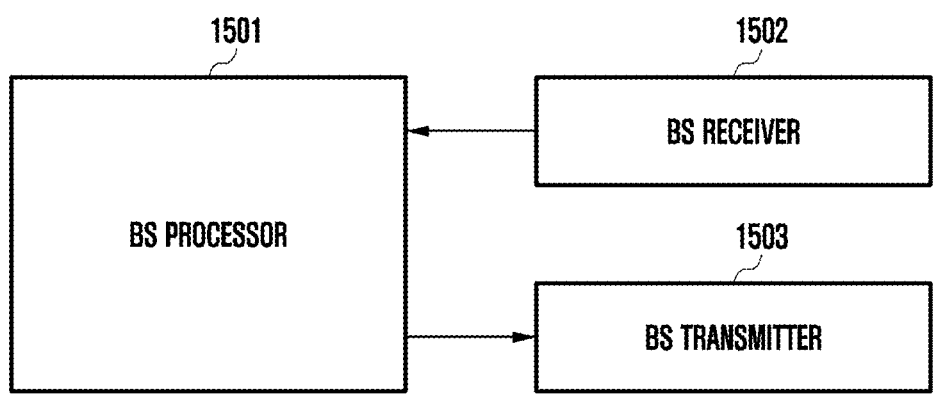
FIG. 15 is a block diagram illustrating the internal structure of a base station (BS) according to an embodiment of the disclosure.

In order to implement the embodiments of the disclosure, the transmitters, the receivers, and the controllers of a UE and a BS are illustrated in FIG. 14 and FIG. 15, respectively. A transmission or reception method of a BS and a UE for applying the method of transmitting or receiving a downlink control channel and downlink control information in the 5G communication system corresponding to the embodiment is illustrated, and the transmitters, the receivers, and the processors of the BS and the UE need to operate in order to implement the same.

FIG. 14 is a block diagram illustrating the internal structure of a user equipment (UE) according to an embodiment. As illustrated in FIG. 14, the UE of the disclosure may include a UE processor 1401, a UE receiver 1402, and a UE transmitter 1403.

The UE processor 1401 may control a series of processes such that the UE operates according to the above-described embodiments of the disclosure. For example, a method of monitoring a PDCCH, a method of reinterpreting the configuration of a control region, and the like according to embodiments of the disclosure may be differently controlled. The UE processor 1401 may be referred to as a controller or a control unit, and may include at least one processor. The UE processor 1401 may perform control so as to: receive, from a BS, first information associated with the number of physical downlink control channel (PDCCH) candidates and second information associated with the number of control channel elements (CCE); transmitting a beam failure recovery (BFR) request message to the BS in a first slot in case that a link failure occurs; selecting a search space set of a first control region and a search space set of a second control region associated with BFR in a second slot; and monitoring control information for receiving a BFR response message in the selected search space set of the second control region. Also, the UE processor 101 may perform control so as to preferentially select the search space set of the second control region in the second slot in case that information associated with a PDCCH of the first control region and the second control region does not satisfy at least one of a first condition determined based on the first information or a second condition determined based on the second information. In addition, the UE processor 1401 may perform control so as to select a search space set, of which the search space type is set to a common search space, from the first control region, after selecting the search space set of the second control region. In addition, the UE processor 1401 may perform control so as to preferentially select a search space having a low search space index from among search space sets of which search space types are set to a UE-specific search space after selecting the search space set of which the search space type is set to a common search space. The information associated with the PDCCH may include the number of PDCCH candidates and the number of CCEs configured in the first control region and the second control region, and the first condition is that the number of configured PDCCH candidates be less than or equal to the number of PDCCHs determined based on the first information, and the second condition is that the number of configured CCEs be less than or equal to the number of CCEs determined based on the second information.

The UE receiver 1402 and the UE transmitter 1403 are commonly called a transceiver in the embodiments of the disclosure. The transceiver may perform transmission or reception of a signal with a BS. The signal may include control information and data. To this end, the transceiver includes an RF transmitter that up-converts and amplifies the frequency of a transmitted signal, an RF receiver that low-noise amplifies a received signal and down-converts a frequency, and the like. In addition, the transceiver receives a signal via a wireless channel and outputs the same to the UE processor 1401, and transmits a signal, which is output from the UE processor 1401, via a wireless channel.

FIG. 15 is a block diagram illustrating the internal structure of a base station (BS) according to an embodiment of the disclosure. As illustrated in FIG. 15, the BS of the disclosure may include a BS processor 1501, a BS receiver 1502, and a BS transmitter 1503.

The BS processor 1501 may control a series of processes such that the BS operates according to the above-described embodiments of the disclosure. For example, a PDCCH transmission method, a control region configuration method, or the like according to embodiments of the disclosure may be differently controlled. The BS processor 1501 may be referred to as a controller or a control unit, and may include at least one processor.

The BS processor 1501 may perform control so as to: transmit first information associated with the number of physical downlink control channel (PDCCH) candidates and second information associated with the number of control channel elements (CCEs) to a user equipment (UE); receive a beam failure recovery (BFR) request message from a user equipment (UE) in a first slot; select a search space set of a first control region and a search space set of a second control region associated with BFR in a second slot; and transmit control information for reception of a BFR response message in a resource of the selected search space set of the second control region.

In addition, the BS processor 1501 may perform control so as to preferentially select the search space set of the second control region in case that information associated with a PDCCH of the first control region and the second control region does not satisfy at least one of a first condition determined based on the first information or a second condition determined based on the second information in the second slot. In addition, the BS processor 1501 may perform control so as to select a search space set of which the search space type is set to a common search space from the first control region, after selecting the search space set of the second control region. In addition, the BS processor 1501 may perform control so as to preferentially select a search space having a low search space index from among search space sets of which search space types are set to a UE-specific search space after selecting the search space set of which the search space type is set to a common search space. The information associated with the PDCCH may include the number of PDCCH candidates and the number of CCEs configured in the first control region and the second control region, and the first condition is that the number of configured PDCCH candidates be less than or equal to the number of PDCCHs determined based on the first information, and the second condition is that the number of configured CCEs be less than or equal to the number of CCEs determined based on the second information.

The BS receiver 1502 and the BS transmitter 1503 are commonly called a transceiver in the embodiments of the disclosure. The transceiver may perform transmission or reception of a signal with a user equipment (UE). The signal may include control information and data. To this end, the transceiver may include an RF transmitter that up-converts and amplifies the frequency of a transmitted signal, an RF receiver that low-noise amplifies a received signal and down-converts a frequency, and the like. In addition, the transceiver may output, to the BS processor 1501, a signal received via a wireless channel, and may transmit a signal output from the BS processor 1501 via a wireless channel.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other variants may be implemented on the basis of the technical idea of the disclosure. Further, the above respective embodiments may be employed in combination, as necessary.

The invention claimed is:

1. A method of operating a user equipment (UE), the method comprising:
receiving, from a base station (BS), first information associated with a number of physical downlink control channel (PDCCH) candidates and second information associated with a number of control channel elements (CCE);
transmitting a beam failure recovery (BFR) request message to the BS in a first slot in case that a link failure occurs;
selecting a search space set of a first control region and a search space set of a second control region associated with BFR in a second slot; and
monitoring control information for receiving a BFR response message in the selected search space set of the second control region,
wherein the search space set of the second control region is selected preferentially in the second slot in case that information associated with a PDCCH of the first control region and the second control region does not satisfy at least one of a first condition determined based on the first information or a second condition determined based on the second information.

2. The method as claimed in claim 1, wherein, after the search space set of the second control region is selected, a search space set of which a search space type is set to a common search space is selected from the first control region.

3. The method as claimed in claim 2, wherein, after the search space set of which the search space type is set to a common search space is selected, a search space having a low search space index is preferentially selected among search space sets of which search space types are set to a UE-specific search space.

4. The method as claimed in claim 1, wherein the information associated with the PDCCH comprises a number of PDCCH candidates and a number of CCEs configured in the first control region and the second control region, and
wherein the first condition is that a number of configured PDCCH candidates be less than or equal to a number of PDCCHs determined based on the first information, and the second condition is that a number of configured CCEs be less than or equal to a number of CCEs determined based on the second information.

5. A user equipment (UE), comprising:
a transceiver; and
a controller coupled with the transceiver and configured to:
receive first information associated with a number of physical downlink control channel (PDCCH) candidates and second information associated with a number of control channel elements (CCEs) from a base station (BS),
in case that a link failure occurs, transmit a beam failure recovery (BFR) request message to the BS in a first slot,
select a search space set of a first control region and a search space set of a second slot associated with BFR in a second slot, and
monitor control information for receiving a BFR response message in the selected search space set of the second control region,
wherein the search space set of the second control region is preferentially selected in the second slot in case that information associated with a PDCCH of the first control region and the second control region does not satisfy at least one of a first condition determined based on the first information or a second condition determined based on the second information.

6. The UE as claimed in claim 5, wherein, after the search space set of the second control region is selected, a search space set of which a search space type is set to a common search space is selected from the first control region.

7. The UE as clamed in claim 6, wherein, after the search space set, the search space type of which is set to a common search space, is selected, a search space having a low search space index is preferentially selected from among search space sets of which search space types are set to a UE-specific search space.

8. The UE as claimed in claim 5, wherein the information associated with the PDCCH comprises a number of PDCCH candidates and a number of CCEs configured in the first control region and the second control region, and
wherein the first condition is that a number of configured PDCCH candidates be less than or equal to a number of PDCCHs determined based on the first information and the second condition is that a number of configured CCEs be less than or equal to a number of CCEs determined based on the second information.

9. A method of operating a base station (BS), the method comprising:
transmitting first information associated with a number of physical downlink control channel (PDCCH) candidates and second information associated with a number of control channel elements (CCEs) to a user equipment (UE);
receiving a beam failure recovery (BFR) request message from a user equipment (UE) in a first slot;
selecting a search space set of a first control region and a search space set of a second control region associated with BFR in a second slot; and
transmitting control information for reception of a BFR response message in a resource of the selected search space set of the second control region,
wherein the search space set of the second control region is preferentially selected in the second slot in case that information associated with a PDCCH of the first control region and the second control region does not satisfy at least one of a first condition determined based on the first information or a second condition determined based on the second information.

10. The method as claimed in claim 9, wherein, after the search space set of the second control region is selected, a search space set of which a search space type is set to a common search space is selected from the first control region.

11. The method as claimed in claim 10, wherein, after the search space set of which the search space type is set to a common search space is selected, a search space having a low search space index is preferentially selected from among search space sets of which search space types are set to a UE-specific search space.

12. The method as clamed in claim 9, wherein the information associated with the PDCCH comprises a number of PDCCH candidates and a number of CCEs configured in the first control region and the second control region, and
wherein the first condition is that a number of configured PDCCH candidates be less than or equal to a number of PDCCHs determined based on the first information, and the second condition is that a number of configured CCEs be less than or equal to a number of CCEs determined based on the second information.

13. A base station (BS), comprising:
a transceiver; and
a controller coupled with the transceiver and configured to:
transmit, to a user equipment (UE), first information associated with a number of physical downlink control channel (PDCCH) candidates and second information associated with a number of control channel elements (CCEs),
receive a beam failure recovery (BFR) request message from the UE in a first slot,
select a search space set of a first control region and a search space set of a second control region associated with BFR in a second slot, and
transmit control information for reception of a BFR response message in a resource of the selected search space set of the second control region,
wherein the search space set of the second control region is preferentially selected in the second slot in case that information associated with a PDCCH of the first control region and the second control region does not satisfy at least one of a first condition determined based on the first information or a second condition determined based on the second information.

14. The BS as claimed in claim 13, wherein, after the search space set of the second control region is selected, a search space set of which a search space type is set to a common search space is selected from the first control region, and
wherein, after the search space set of which the search space type is set to a common search space is selected, a search space having a low search space index is preferentially selected from among search space sets of which search space types are set to a UE-specific search space.

15. The BS as claimed in claim 13, wherein the information associated with the PDCCH comprises a number of PDCCH candidates and a number of CCEs configured in the first control region and the second control region, and
wherein the first condition is that a number of configured PDCCH candidates be less than or equal to a number of PDCCHs determined based on the first information, and the second condition is that a number of configured CCEs be less than or equal to a number of CCEs determined based on the second information.

* * * * *